US011149670B2

United States Patent
Yoshioka

(10) Patent No.: US 11,149,670 B2
(45) Date of Patent: Oct. 19, 2021

(54) EXHAUST PURIFICATION SYSTEM

(71) Applicant: AISAN KOGYO KABUSHIKI KAISHA, Obu (JP)

(72) Inventor: Mamoru Yoshioka, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/959,338

(22) PCT Filed: Jan. 29, 2019

(86) PCT No.: PCT/JP2019/002851
§ 371 (c)(1),
(2) Date: Jun. 30, 2020

(87) PCT Pub. No.: WO2019/167520
PCT Pub. Date: Sep. 6, 2019

(65) Prior Publication Data
US 2020/0355135 A1  Nov. 12, 2020

(30) Foreign Application Priority Data

Feb. 27, 2018 (JP) .............................. JP2018-033138

(51) Int. Cl.
*F02M 25/08* (2006.01)
*F02D 41/02* (2006.01)
(Continued)

(52) U.S. Cl.
CPC ............. *F02D 41/024* (2013.01); *F01N 3/28* (2013.01); *F01N 3/32* (2013.01); *F01N 3/36* (2013.01);
(Continued)

(58) Field of Classification Search
CPC ...... F02D 41/024; F02D 41/004; F02D 41/22; F02D 41/025; F02D 41/0035;
(Continued)

(56) References Cited

FOREIGN PATENT DOCUMENTS

| JP | H02-115950 U | 9/1990 |
| JP | H06-167253 A | 6/1994 |

(Continued)

OTHER PUBLICATIONS

Apr. 16, 2019 Search Report issued in International Patent Application No. PCT/JP2019/002851.
(Continued)

*Primary Examiner* — Hai H Huynh
(74) *Attorney, Agent, or Firm* — Oliff PLC

(57) ABSTRACT

This exhaust purification system includes: a pump disposed in an exhaust-side purge passage to supply air or purge gas purged from a canister to a catalyst; a three-way valve disposed upstream of the pump in the exhaust-side purge passage and configured to switch the exhaust-side purge passage between a communicating state allowing the pump to communicate with the canister and an atmosphere open state allowing the pump to communicate with the atmosphere; a flow control valve disposed downstream of the pump and configured to control a flow rate of air to be supplied to the catalyst; and a controller configured to, when a request to regenerate the catalyst occurs, control a purge valve, the pump, the three-way valve, and the flow control valve to supply, to the catalyst, purge gas purged from the canister and air by a necessary amount to burn particulates trapped in the catalyst.

18 Claims, 25 Drawing Sheets

(51) Int. Cl.
  *F01N 3/28*    (2006.01)
  *F01N 3/32*    (2006.01)
  *F01N 3/36*    (2006.01)
  *F02D 41/00*   (2006.01)
  *F02D 41/22*   (2006.01)
  *F02M 35/10*   (2006.01)

(52) U.S. Cl.
  CPC .......... *F02D 41/004* (2013.01); *F02D 41/22* (2013.01); *F02M 25/0836* (2013.01); *F02M 25/0854* (2013.01); *F02M 35/10222* (2013.01); *F02D 2041/225* (2013.01); *F02D 2200/0602* (2013.01); *F02D 2200/0802* (2013.01)

(58) Field of Classification Search
  CPC .......... F02D 41/029; F02D 2041/225; F02D 2200/0602; F02D 2200/0802; F02D 2200/0804; F01N 3/28; F01N 3/32; F01N 3/36; F01N 3/035; F01N 3/101; F01N 3/0253; F01N 3/021; F01N 3/033; F01N 3/023; F01N 2610/06; F01N 2610/1433; F01N 2610/1406; F01N 2610/03; F01N 2610/085; F02M 25/0836; F02M 25/0854; F02M 25/08; F02M 35/10222; Y02T 10/12
  USPC .......... 123/516, 117, 518, 519, 520, 568.17, 123/568.19, 568.2; 701/103, 108; 60/602, 605.2, 315
  See application file for complete search history.

(56) References Cited

FOREIGN PATENT DOCUMENTS

| JP | H07-091337 A | 4/1995 |
| JP | H07-097909 A | 4/1995 |
| JP | 2017-218931 A | 12/2017 |

OTHER PUBLICATIONS

Aug. 27, 2020 International Preliminary Report on Patentability issued in International Patent Application No. PCT/JP2019/002851.

EXHAUST PURIFICATION SYSTEM

CROSS-REFERENCE TO RELATED APPLICATIONS

This is a US national phase application based on the PCT International Patent Application No. PCT/JP2019/002851 filed on Jan. 29, 2019, and claiming the priority of Japanese Patent Application No. 2018-033138 filed on Feb. 27, 2018, the entire contents of which are herewith incorporated by reference.

TECHNICAL FIELD

The present disclosure relates to an exhaust purification system capable of removing trapped particulates from a catalyst that can trap particulates.

BACKGROUND ART

A particulate filter is provided in an exhaust passage as a catalyst for trapping and removing particulates contained in exhaust gas from an internal combustion engine. The particulate filter operates to burn the trapped particulates in a filter regeneration process to remove the particulates. It is therefore known to utilize evaporated fuel to burn the particulates. As such an exhaust purification device, for example, the following Patent Document 1 has been known.

This exhaust purification device includes a particulate filter for trapping particulates, a canister for trapping evaporated fuel, a bypass passage connecting an internal combustion engine and the upstream side of the particulate filter, an evaporated fuel passage connecting the canister and the bypass passage, and an ejector provided in the bypass passage and the evaporating fuel passage.

In this exhaust purification device, the ejector during fuel cut acts to supply the evaporated fuel from the canister to the particulate filter in which the particulates are burnt.

RELATED ART DOCUMENTS

Patent Documents

Patent Document 1: JP-A-2017-218931

SUMMARY OF INVENTION

Problems to be Solved by the Invention

However, in the above exhaust purification device, the amount of air supplied to the particulate filter during filter regeneration is a resulting air amount during fuel cut. Thus, the amount of air needed to burn the evaporated fuel supplied from the canister to the particulate filter may be insufficient. This insufficient amount of air supplied to the particulate filter results in inadequate heating of the particulate filter and hence insufficient burning of the trapped particulates. Thus, the trapped particulates may not be appropriately removed from the particulate filter. Furthermore, the evaporated fuel (unburnt HC) may not be cleaned by the catalyst and may be released into the atmosphere.

The present invention has been made in view of the circumstances to solve the above problems and has a purpose to provide an exhaust purification system capable of reliably burning particulates accumulated in a catalyst and supplied evaporated fuel to make sure removal of the particulates during regeneration of the catalyst.

Means of Solving the Problems

To achieve the above purpose, one aspect of the invention provides an exhaust purification system comprising: a canister configured to trap evaporated fuel that evaporates from a fuel tank; an intake-side purge passage connecting the canister and an intake passage of an internal combustion engine; a purge valve configured to open and close the intake-side purge passage; a catalyst configured to trap particulates in exhaust gas to purify the exhaust gas; an exhaust-side purge passage branching from the intake-side purge passage at an upstream side of the purge valve, the exhaust-side purge passage connecting to the canister and to an exhaust passage of the internal combustion engine on an upstream side of the catalyst; a pump provided in the exhaust-side purge passage and configured to supply air or purge gas purged from the canister to the catalyst; a three-way valve provided on an upstream side of the pump in the exhaust-side purge passage and configured to switch a state of the exhaust-side purge passage between a communication state allowing the pump to communicate with the canister and an atmosphere open state allowing the pump to communicate with atmosphere; a flow control valve provided on a downstream side of the pump in the exhaust-side purge passage and configured to control a flow rate of air to be supplied to the catalyst; and a controller configured to control the purge valve, the pump, the three-way valve, and the flow control valve when a request for catalyst regeneration occurs, to supply a necessary amount of air to burn the particulates trapped in the catalyst and a necessary amount of the purge gas purged from the canister to the catalyst.

In the foregoing exhaust purification system, during regeneration of the catalyst, the controller controls the purge valve, the pump, the three-way valve, and the flow control valve to reliably supply a necessary amount of air and a necessary amount of purge gas (evaporated fuel) to burn the particulates having been trapped and accumulated in the catalyst. Therefore, there is no possibility that air to be supplied to the catalyst does not become insufficient during regeneration of the catalyst. Thus, the particulates having been trapped and accumulated in the catalyst can be reliably burnt and removed from the catalyst. Even in an operating state other than a fuel cut operation, moreover, the regeneration process of catalyst can be executed.

In the foregoing exhaust purification system, preferably, the controller is configured to control each operation of the purge valve, the pump, and the three-way valve based on an estimated bed temperature of the catalyst calculated based on a rotation speed of the internal combustion engine, an intake air amount, and an air-fuel ratio, and a concentration of the purge gas purged from the canister into the intake-side purge passage, and control an opening degree of the flow control valve based on the intake air amount of the internal combustion engine.

In the foregoing structure, the controller controls the purge valve, the pump, the three-way valve, and the flow control valve based on the estimated bed temperature of the catalyst, the concentration of the purge gas, and the intake air amount during regeneration of the catalyst. Therefore, air and purge gas can be reliably supplied to the catalyst at respective amounts needed to burn the particulates trapped and accumulated in the catalyst according to the operating state of the internal combustion engine. This makes it possible to effectively conduct the regeneration process of the catalyst even when for example the bed temperature of the catalyst is low.

In the foregoing exhaust purification system, preferably, when it is determined that the estimated bed temperature of the catalyst is equal to or higher than a predetermined temperature, the controller is configured to bring the three-way valve into the atmosphere open state. It is to be noted that the predetermined temperature represents a temperature at which the catalyst can be regenerated by supply of air even through purge gas is not supplied to the catalyst.

In the foregoing structure, when the estimated bed temperature of the catalyst is equal to or higher than the predetermined temperature, the three-way valve is brought in the atmosphere open state, so that no purge gas is supplied from the canister to the catalyst, but only air is supplied through the pump to the catalyst. Thus, all the purge gas purged from the canister will be supplied to the intake-side purge passage. This can prevent deterioration in fuel consumption during regeneration process of the catalyst.

In the foregoing exhaust purification system, preferably, when it is determined that the estimated bed temperature of the catalyst is lower than a predetermined temperature and the concentration of the purge gas is lower than a first predetermined concentration at which particulates accumulated in the catalyst are burnt by the purge gas, the controller is configured to perform rich control of the internal combustion engine so that an air-fuel ratio is lower than a theoretical air-fuel ratio and bring the three-way valve into the atmosphere open state.

In the foregoing structure, when the estimated bed temperature of the catalyst is lower than the predetermined temperature and the concentration of the purge gas is equal to or lower than the first predetermined concentration, the internal combustion engine is subjected to rich control, thus allowing unburnt gas to be supplied from the internal combustion engine to the catalyst. Furthermore, the three-way valve is brought into the atmosphere open state, allowing air to be supplied to the catalyst through the pump. When catalyst regeneration is requested, consequently, even if the catalyst bed temperature is low and a necessary amount of purge gas is not allowed to be supplied from the canister to the catalyst (a low purge concentration), the unburnt gas is supplied from the internal combustion engine to the catalyst and thus the particulates trapped and accumulated in the catalyst can be reliably burnt.

In the foregoing exhaust purification system, preferably, when it is determined that the estimated bed temperature of the catalyst is lower than a predetermined temperature and the concentration of the purge gas is equal to or higher than a first predetermined concentration at which particulates accumulated in the catalyst are burnt by the purge gas, the controller is configured to fully close the purge valve to close off the intake-side purge passage and bring the three-way valve into the communication state.

In the foregoing structure, when the estimated bed temperature of the catalyst is lower than the predetermined temperature and the concentration of the purge gas is equal to or higher than the first predetermined concentration, the purge valve is turned OFF to shut off the intake-side purge passage, and the three-way valve is to brought into the communicable state. Thus, the purge gas is supplied from the canister to the catalyst through the exhaust-side purge passage. Even if the bed temperature of the catalyst is low, accordingly, the catalyst bed temperature is increased, thereby allowing the particulates trapped and accumulated in the catalyst to be reliably burnt.

In the foregoing exhaust purification system, preferably, when it is determined that the concentration of the purge gas is equal to or higher than a second predetermined concentration that is higher than the first predetermined concentration, the controller is configured to perform switch control to switch the three-way valve between the communication state and the atmosphere open state at a predetermined ratio within a constant time determined according to the concentration of the purge gas at intervals of the constant time.

In the foregoing structure, when the concentration of the purge gas is equal to or higher than the second concentration (high purge concentration), the three-way valve is switched at the predetermined ratio set according to the concentration of the purge gas at intervals of constant time between the communicable state and the atmosphere open state. Thus, the purge gas is supplied to the catalyst while the purge gas is being diluted, so that the particulates having been trapped and accumulated in the catalyst and the supplied evaporated fuel can be reliably burnt.

Preferably, the foregoing exhaust purification system further includes: an on-off valve configured to open and close an atmosphere port of the canister; and a pressure sensor configured to detect pressure in the fuel tank, wherein the controller is configured to: control the on-off valve, the purge valve, the three-way valve, the flow control valve, and the pump after stop of the internal combustion engine to generate a negative pressure in the exhaust-side purge passage on an upstream side of the three-way valve and in the intake-side purge passage on an upstream side of the purge valve, the purge passages being connected to the fuel tank; detect the pressure in the fuel tank through the pressure sensor; and detect whether a hole exists in the exhaust-side purge passage and the intake-side purge passage based on a change in the pressure detected by the pressure sensor.

The above configuration includes the on-off valve for opening and closing the atmosphere port of the canister and the pressure sensor for detecting the pressure in the fuel tank. Accordingly, when the controller controls the on-off valve, the purge valve, the three-way valve, the flow control valve, and the pump after stop of the internal combustion engine, the negative pressure can be generated in the exhaust-side purge passage upstream of the three-way valve and the intake-side purge passage upstream of the purge valve, each purge passage being connected to the fuel tank. Based on a change in pressure detected by the pressure sensor, the controller can detect whether or not a hole or holes exists in the exhaust-side purge passage upstream of the three-way valve and the intake-side purge passage upstream of the purge valve, each purge passage being connected to the fuel tank. Consequently, the necessary amount of air and the necessary amount of purge gas are reliably supplied to the catalyst during regeneration of the catalyst and also abnormalities in the exhaust-side purge passage and the intake-side purge passage can be detected promptly.

In the foregoing exhaust purification system, preferably, the controller is configured to correct a determination reference value for detecting whether or not a hole exists according to a fuel level in the fuel tank.

In the foregoing structure, the determination reference value for detecting the presence or absence of a hole(s) ("hole detection") is determined based on that the volume of negative pressure created in the purge passages when the presence/absence of a hole(s) is to be detected is different according to a fuel level (a fuel remaining amount) in the fuel tank, so that the presence/absence of a hole can be detected with accuracy.

Preferably, the foregoing exhaust purification system further includes a trap canister provided in the exhaust-side purge passage on the upstream side of the pump and configured to trap the purge gas.

In the foregoing structure, when the hole detection is performed, the purge gas (also containing the evaporated fuel in the fuel tank) to be purged from the canister can be trapped in the trap canister. This makes it possible to prevent the purge gas from flowing in the exhaust passage during the hole detection (i.e., during stop of the internal combustion engine). This can prevent release of the purge gas from the exhaust passage to the atmosphere.

Preferably, the foregoing exhaust purification system further includes: a bypass passage detouring around the trap canister; and a bypass passage on-off valve configured to open and close the bypass passage, wherein the controller is configured to fully open the bypass passage on-off valve to open the bypass passage when the request for regeneration of the catalyst occurs.

The foregoing structure even through including the trap canister can supply purge gas from the canister to the catalyst without delay in response to the request for filter regeneration.

In the foregoing exhaust purification system, preferably, the trap canister is provided between the three-way valve and the pump, and he controller is configured to control the three-way valve, the pump, and the flow control valve to perform air purge of the trap canister after completion of warm-up of the catalyst.

In the foregoing structure, since warm-up of the catalyst has been completed at the time when the purge gas purged from the trap canister by air purge of the trap canister flows in the exhaust passage, the purge gas can be burnt in the catalyst. This can prevent release of the purge gas purged from the trap canister to the atmosphere through the exhaust passage.

In the foregoing exhaust purification system, preferably, the trap canister is provided on the upstream side of the three-way valve, the exhaust purification system further includes a three-way valve for trap canister provided on an upstream side of the trap canister and configured to allow the trap canister to communicate with either the canister or atmosphere, and the controller is configured to control the three-way valve, the three-way valve for trap canister, the pump, and the flow control valve to perform the air purge of the trap canister after completion of warm-up of the catalyst.

In the foregoing structure, since warm-up of the catalyst has been completed at the time when the purge gas purged from the trap canister by air purge of the trap canister flows in the exhaust passage, the purge gas can be burnt in the catalyst. This can also prevent release of the purge gas purged from the trap canister to the atmosphere through the exhaust passage.

In the foregoing exhaust purification system, preferably, the controller is configured to perform air purge of the trap canister when a purge request is present while the trap canister is in a saturated state.

In the foregoing structure, after warm-up of the catalyst has been completed, when the purge request is present while the trap canister is in a saturated state, the controller performs air purge of the trap canister. Accordingly, the saturated state of the trap canister is eliminated before the hole detection is performed, so that the purge gas from the canister can be trapped in the trap canister. This makes it possible to prevent the purge gas from flowing in the exhaust passage during the hole detection (i.e., during stop of the internal combustion engine). This can prevent release of the purge gas from the exhaust passage to the atmosphere.

In the foregoing exhaust purification system, preferably, the controller is configured to perform the air purge of the trap canister when the internal combustion engine is stopped.

In the foregoing structure, after warm-up of the catalyst has been completed, when the internal combustion engine is stopped, the controller performs air purge of the trap canister. Accordingly, the saturated state of the trap canister is eliminated before the hole detection is performed, so that the purge gas from the canister can be trapped in the trap canister. This makes it possible to prevent the purge gas from flowing in the exhaust passage during the hole detection (i.e., during stop of the internal combustion engine). This can prevent release of the purge gas from the exhaust passage to the atmosphere.

In the foregoing exhaust purification system, preferably, the controller is configured to perform switching control to switch the bypass passage on-off valve between a fully closed state and a fully open state at a predetermined ratio within a constant time determined according to a concentration of the purge gas at intervals of the constant time during the air purge of the trap canister.

In the foregoing structure, the controller performs the air purge of the trap canister while switching the bypass passage on-off valve alternately between the fully closed state and the fully open state at the predetermined ratio set according to the concentration of the purge gas at intervals of the constant time. When the purge gas trapped in the trap canister has a high concentration, therefore, the high-concentration purge gas purged from the trap canister is diluted in concentration with air during the air purge of the trap canister. Accordingly, when the trap canister is subjected to the air purge, the purge gas of which concentration has been diluted is allowed to flow in the exhaust passage. In other word, no high-concentration purge gas flows therein. Thus, the purge gas flowing in the exhaust passage can be reliably burnt in the catalyst. This makes it possible to prevent the purge gas purged from the trap canister from becoming released as remaining unburnt from the exhaust passage to the atmosphere.

In the foregoing exhaust purification system, preferably, the controller is configured to switch the three-way valve between the communication state and the atmosphere open state at a predetermined ratio within a constant time determined according to a concentration of the purge gas at intervals of the constant time during the air purge of the trap canister.

In the foregoing structure, the controller performs the air purge of the trap canister air purge while switching the three-way valve alternately between the communication state and the atmosphere open state at the predetermined ratio set according to the concentration of the purge gas at intervals of the constant time. When the purge gas trapped in the trap canister has a high concentration, therefore, the high-concentration purge gas purged from the trap canister is diluted in concentration with air during the air purge of the trap canister. Accordingly, when the trap canister is subjected to the air purge, the purge gas of which concentration has been diluted is allowed to flow in the exhaust passage. In other word, no high-concentration purge gas flows therein. Thus, the purge gas flowing in the exhaust passage can be reliably burnt in the catalyst. This makes it possible to prevent the purge gas purged from the trap canister from becoming released as remaining unburnt from the exhaust passage to the atmosphere.

Effects of the Invention

According to the exhaust purification system in the present disclosure, during regeneration of the catalyst, the particulates accumulated in the catalyst and the supplied evaporated fuel can be reliably burnt and removed from the catalyst.

MODE FOR CARRYING OUT THE INVENTION

A detailed description of embodiments of a gasoline engine system embodying an exhaust purification system of the present disclosure will now be given referring to the accompanying drawings.

First Embodiment

<Configuration of Engine System and Exhaust Purification System>

Figure 1:
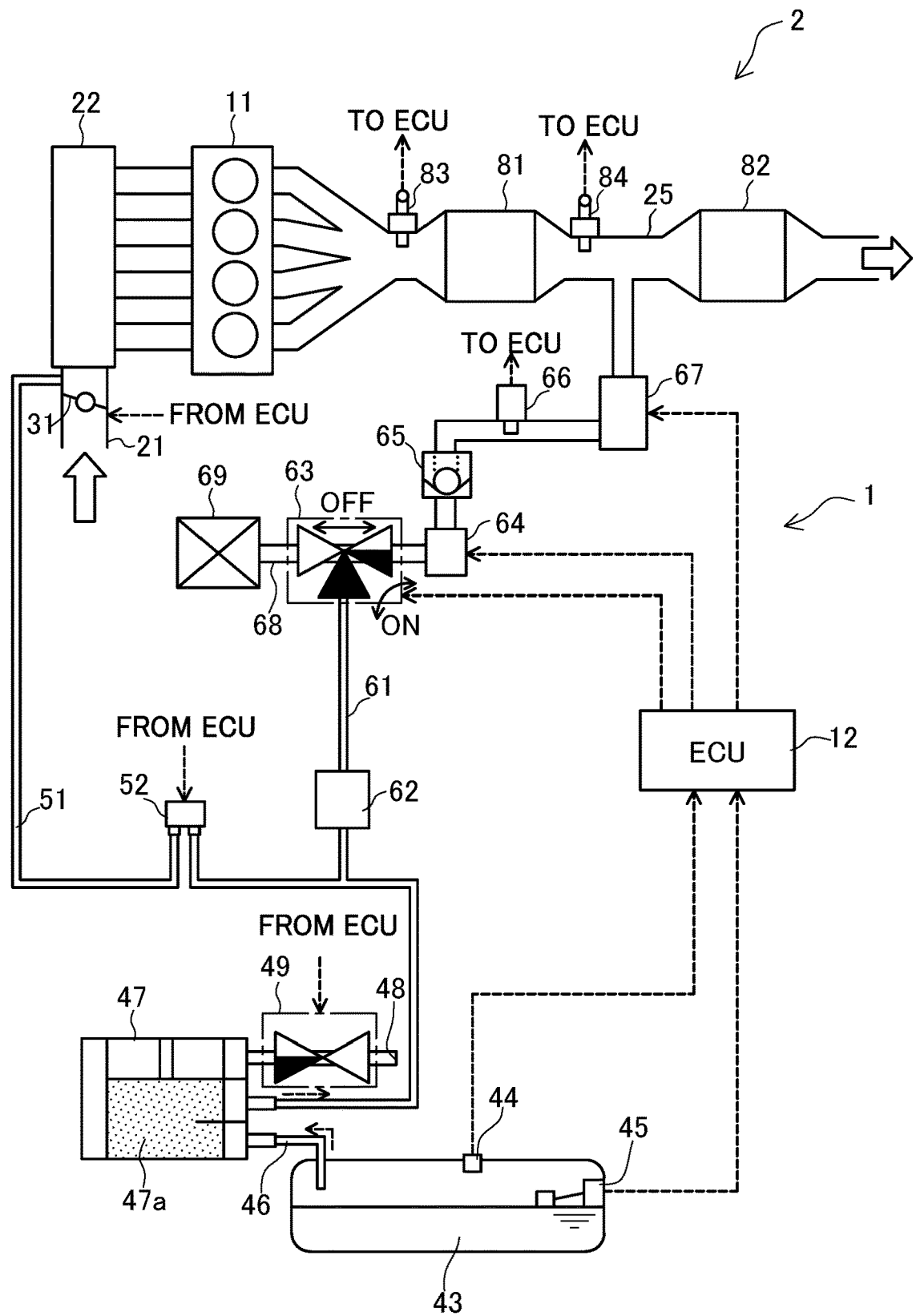
FIG. 1 is a configuration view of an exhaust purification system in a first embodiment.

FIG. 1 is a configuration view showing an engine system 2 provided with an exhaust purification system 1 in the present embodiment. In the engine system 2 in the present embodiment, a throttle valve 31 is provided in an intake passage 21 of an engine 11 (one example of an internal combustion engine). The intake passage 21 is connected to the engine 11 through an intake manifold 22 and configured to allow intake air to flow therethrough so as to be supplied to each cylinder. The throttle valve 31 is configured to control an intake amount of air to be sucked in the engine 11. This intake air amount is detected by an air flow meter (not shown) provided in the intake passage 21. A detection signal representing the intake air amount is transmitted to an ECU (an engine control unit) 12 (one example of a controller). The throttle valve 31 is operated under opening degree control based on a control signal from the ECU 12.

Fuel in a fuel tank 43 is supplied to an injector (not shown) provided at an intake port of the intake manifold 22 through a fuel pipe by a fuel pump (not shown), and then the fuel is injected from the injector into the intake port. The injected fuel is mixed with the intake air, forming a mixture which will be supplied to the engine 11.

Herein, the fuel tank 43 is provided with a tank pressure sensor 44 for measuring the pressure in the fuel tank 43. The fuel tank 43 is further provided with a fuel level gauge 45 for measuring the amount of fuel remaining in the fuel tank 43. The tank pressure sensor 44 and the fuel level gauge 45 are connected to the ECU12 to transmit detected signals of those sensors 44 and 45 to the ECU12. Furthermore, the fuel tank 43 is connected to a canister 47 through a vapor passage 46.

The canister 47 contains adsorbent 47a, e.g. activated carbon, so that adsorbent 47a temporarily adsorbs and stores evaporated fuel generated in the fuel tank 43 through the vapor passage 46. The canister 47 is formed with an atmosphere port 48 communicating with the outside and an on-off valve 49 configured to open and close the atmosphere port 48.

The canister 47 is connected to the intake passage 21 downstream from the throttle valve 31 through an intake-side purge passage 51. This intake-side purge passage 51 is provided with a purge valve 52. The purge valve 52 is connected to the ECU 12 and configured to be operated under opening degree control based on a control signal from the ECU12 to adjust a flow rate of purge gas that flows through the intake-side purge passage 51. Thus, when the intake-side purge valve 52 is opened while the intake passage 21 is in a negative pressure state, fresh air is introduced through the atmosphere port 48, thereby desorbing (purging) the evaporated fuel adsorbed on the adsorbent 47a, so that a predetermined flow rate of purge gas (evaporated fuel) is introduced to the intake passage 21 through the intake-side purge passage 51. The purge gas directed to the intake passage 21 is then supplied to and combusted in the engine 11.

The canister 47 is also connected to an exhaust passage 25 through an exhaust-side purge passage 61 and between two catalysts 81, 82 arranged in series with the exhaust passage 25. The catalyst 81 is intended to purify harmful substances in the exhaust, such as hydrocarbon, carbon monoxide, and nitride oxide. The catalyst 82 is a gasoline particulate filter (GPF) for trapping particulates (fine particles) in the exhaust.

On the exhaust-side purge passage 61, from an upstream side (the side close to the canister 47), there are provided a trap canister 62, a three-way valve 63, a pump 64, a check valve 65, a pressure sensor 66, a flow control valve 67. The three-way valve 63, the pump 64, the pressure sensor 66, and the flow control valve 67 are connected to the ECU12. The three-way valve 63, the pump 64, and the flow control valve 67 are controlled based on control signals from the ECU 12. Accordingly, when a request for regeneration of the catalyst (GPF) 82 occurs, a necessary amount of air to burn the particulates trapped in the catalyst 82 and the purge gas purged from the canister 47 are supplied to the catalyst 82 through the exhaust-side purge passage 61. Details of this GPF regeneration control will be described later.

Furthermore, the exhaust passage 25 is provided with two A/F sensors (air-fuel ratio sensors) 83 and 84. These A/F sensors 83 and 84 are configured to detect a specific component in the exhaust air (e.g., oxygen concentration) to detect an air-fuel ratio (A/F) of the exhaust or intake mixture. These A/F sensors 83 and 84 are connected to the ECU12 to output detection signals to the ECU12.

The trap canister 62 has the same configuration as the canister 47 and is configured to temporarily store the purge gas (evaporated fuel) purged from the canister 47. The three-way valve 63 is configured to switch the state of the exhaust-side purge passage 61 between a communication state allowing the pump 64 to communicate with the canister 47 and an atmosphere open state allowing the pump 64 to communicate with an air inlet pipe 68. This three-way valve 63 is controlled based on control signals from the ECU12 into the communication state when controlled to turn ON and into the atmosphere open state when controlled to turn OFF.

The pump 64 is configured to supply air or purge gas to catalyst 82. This pump 64 is controlled to turn ON/OFF based on control signals from the ECU12 to supply air or purge gas to the catalyst 82. The check valve 65 is configured to allow a fluid to flow from the pump 64 to the exhaust passage 25, but block a fluid from flowing from the exhaust passage 25 to the pump 64. The flow control valve 67 is configured to adjust a flow rate of air to be supplied to the catalyst 82. This flow control valve 67 is controlled to open based on control signals from the ECU 12 to supply an appropriate amount of air to the catalyst 82.

<Catalyst (GPF) Regeneration Process in Exhaust Purification System>

Figure 2:
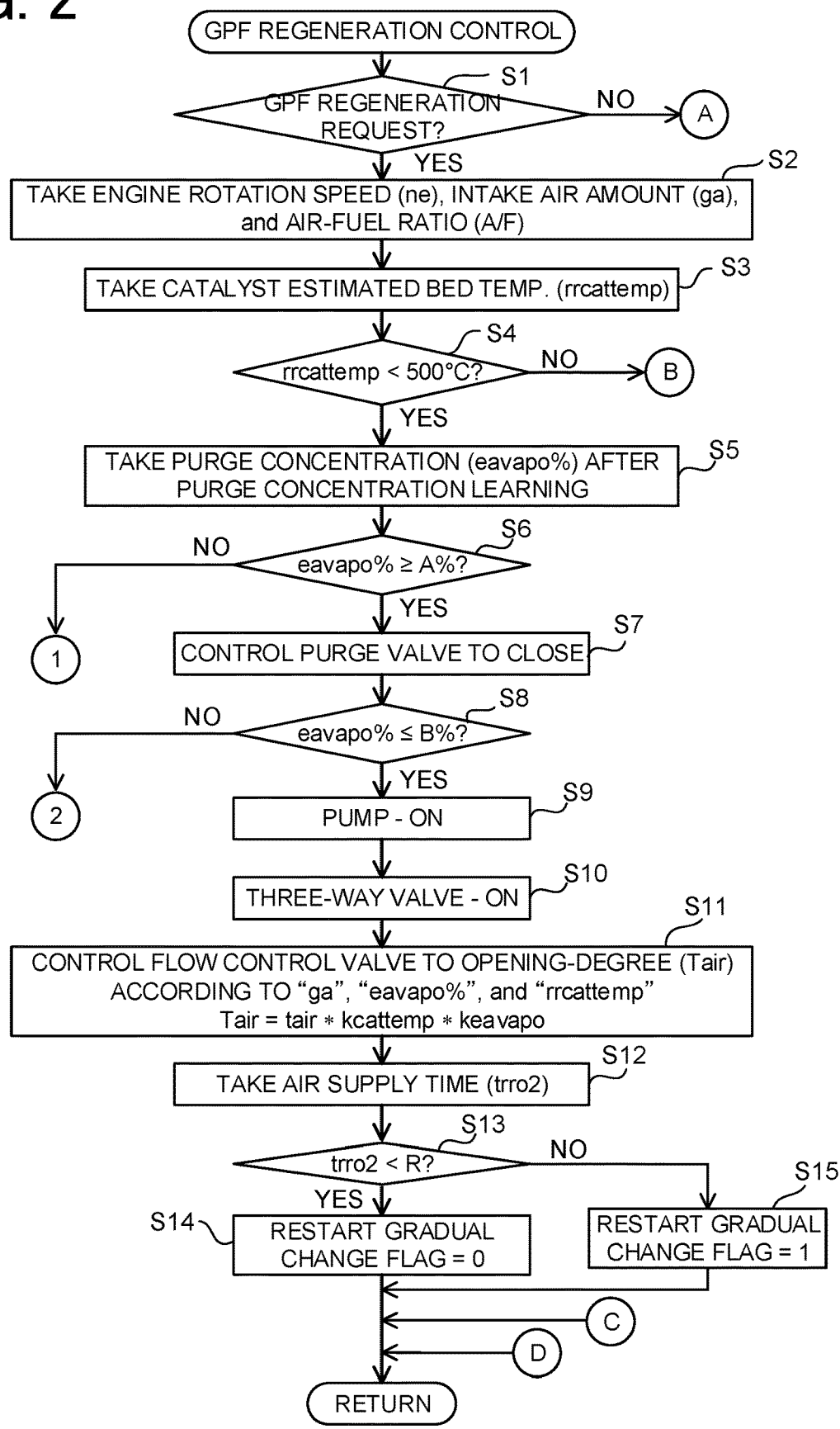
FIG. 2 is a control flowchart showing contents of regeneration control of a catalyst.

Herein, the exhaust purification system 1 in the present embodiment includes the canister 47, the exhaust-side purge passage 61, the trap canister 62, the three-way valve 63, the pump 64, the check valve 65, the pressure sensor 66, and the flow control valve 67, the components 62 to 67 being arranged in the exhaust-side purge passage 61, the catalyst 82 placed in the exhaust passage 25, and the ECU12. In the exhaust purification system 1, the air or purge gas is supplied to the catalyst (GPF) 82 by the pump 64, the catalyst (GPF) 82 undergoes the regeneration process to burn the particulates trapped and accumulated in the catalyst (GPF) 82. Specifically, when a request for regeneration of the catalyst (GPF) 82 occurs, the ECU12 performs the GPF regeneration control based on a control flowchart shown in FIG. 2.

The ECU12 firstly determines whether or not the GPF regeneration request is present (step S1). It is to be noted that the GPF regeneration request occurs when the upstream pressure of the catalyst 82 (the pressure between the catalyst 81 and the catalyst 82) corresponding to the intake air amount of the engine 11 exceeds a determination pressure intended for determining that the amount of accumulated particulates trapped in the catalyst 82 exceeds a reference value. If the GPF regeneration request is present (S1: YES), the ECU12 performs the processes in step S2 and subsequent steps in order to perform the GPF regeneration process. In other words, the ECU 12 takes an engine rotation speed (ne), an intake air amount (ga), and an air-fuel ratio (A/F) from various sensors (step S2) and, based on those detection values, calculates an estimated bed temperature (rrcattemp) of the catalyst 82 (step S3).

The ECU 12 determines whether or not the estimated bed temperature (rrcattemp) of the catalyst 82 is less than 500° C. (step S4). If the estimated bed temperature (rrcattemp) of the catalyst 82 is less than 500° C. (S4: YES), purge gas is supplied to the catalyst 82 because the particulates accumulated in the catalyst 82 are hard to burn by supply of only air to the catalyst 82. For this purpose, the ECU 12 takes a purge concentration (eavapo %) of the purge gas purged from the canister 47 (step S5). The purge concentration (eavapo %) acquired by the ECU 12 is a purge concentration value detected after a learning process of the purge concentration is performed during intake-side purge in which purge gas is supplied to the intake side.

Subsequently, the ECU 12 determines whether or not the purge concentration (eavapo %) is equal to or larger than a predetermined concentration A % (step S6). This predetermined concentration A denotes a lowest concentration at which particulates can be burnt by the purge gas when the purge gas is supplied to the catalyst 82, that is, a lower limit concentration of purge gas allowed to be supplied to the catalyst 82 during GPF regeneration. When the purge concentration (eavapo %) is the concentration A % or more (S6: YES), the ECU 12 controls the purge valve 52 to close (step S7). Thus, the intake-side purge passage 51 is closed, stopping intake-side purge, and the purge concentration learning process is also stopped. Accordingly, the exhaust-side purge for supplying purge gas to the exhaust side, which will be performed in subsequent processes, is controlled based on the purge concentration (the value acquired in S5) at the start of the exhaust-side purge.

Successively, the ECU 12 determines whether or not the purge concentration (eavapo %) is equal to or lower than a predetermined concentration B % (step S8). It is to be noted that the predetermined concentration B denotes a concentration at which purge gas is partly left unburnt (shortage of air) when the purge gas is supplied to the catalyst 82 to burn particulates, that is, an upper limit concentration of purge gas allowed to be supplied to the catalyst 82 during GPF regeneration. When the purge concentration (eavapo %) is the concentration B % or less (S8: YES), the ECU 12 turns the pump 64 ON (step S9) and turns the three-way valve 63 ON (a communication state) (step S10). Thus, air and purge gas are supplied to the catalyst 82.

At that time, the ECU 12 controls the opening degree of the flow control valve 67 based on the intake air amount (ga), the purge concentration (eavapo %), and the estimated bed temperature (rrcattemp) of the catalyst 82 (step S11). Specifically, the opening degree of the flow control valve 67 is finally determined in such a manner that a basic opening degree (tair) is decided based on the intake air amount (ga) and this basic opening degree (tair) is multiplied by concentration correction coefficients (keavapo, kcattemp) determined respectively by the purge concentration (eavapo %) and the catalyst estimated bed temperature (rrcattemp). In other words, the final opening degree (Tair) of the flow control valve 67 is determined by the following expression.

$$Tair = tair \times keavapo \times kcattemp$$

Figure 3:
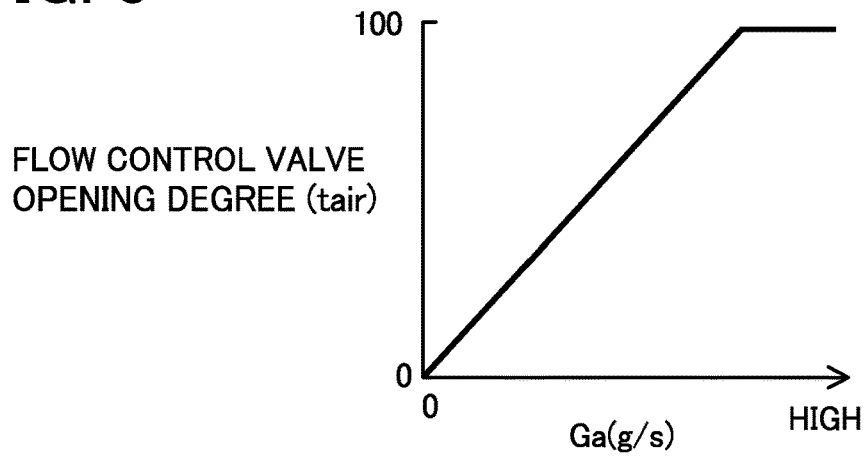
FIG. 3 is a data map showing a relationship between an opening degree of a flow control valve and an intake air amount.
Figure 4:
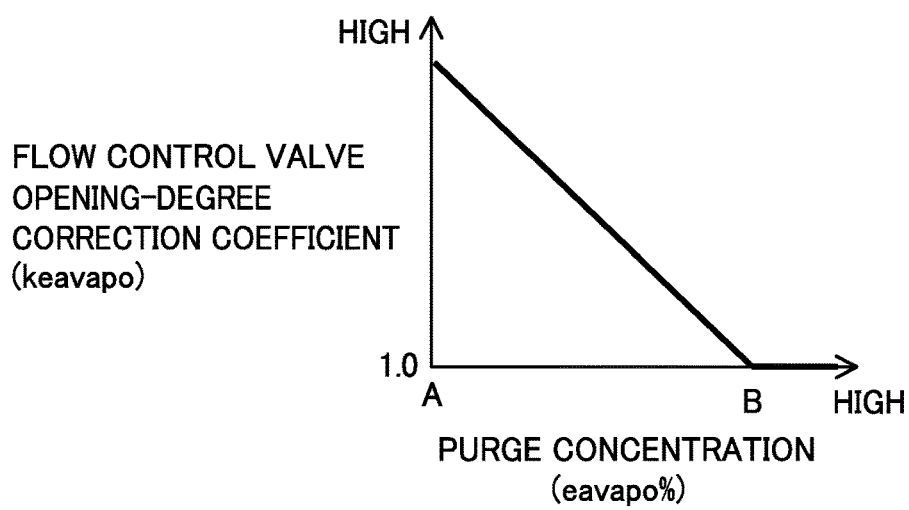
FIG. 4 is a data map showing a relationship between an opening degree correction coefficient and a purge concentration.
Figure 5:
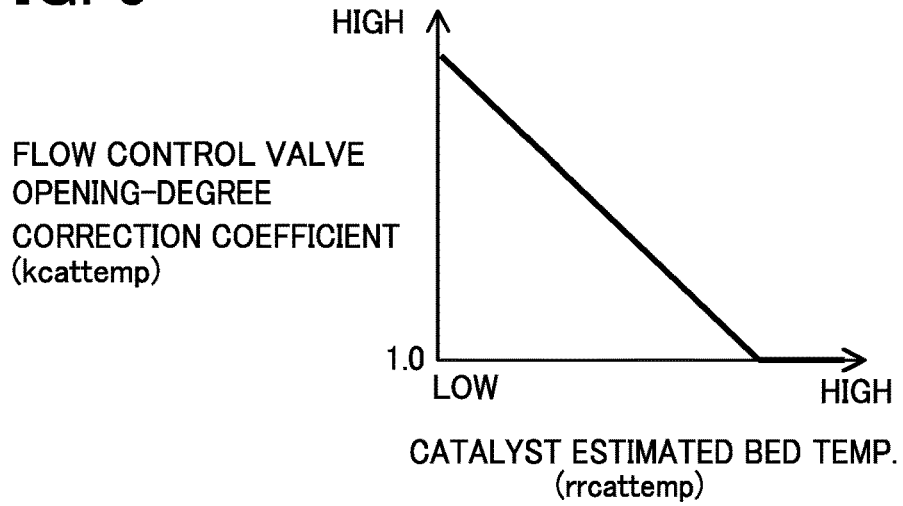
FIG. 5 is a data map showing a relationship between the opening degree correction coefficient and a catalyst estimated bed temperature.

The basic opening degree (tair) is determined so as to be larger as the intake air amount (ga) is higher as shown in FIG. 3. The correction coefficient (keavapo) according to the purge concentration (eavapo %) is determined to be larger as the purge concentration (eavapo %) is lower as shown in FIG. 4. Further, the correction coefficient (kcattemp) according to the catalyst estimated bed temperature (rrcattemp) is determined to be larger as the catalyst estimated bed temperature (rrcattemp) is lower as shown in FIG. 5. The relationships shown in FIGS. 3 to 5 are each stored as a data map in advance in the ECU 12. Those data maps are specified in advance by an experiment and others.

As described above, when the estimated bed temperature (rrcattemp) of the catalyst 82 is less than 500° C. and the purge concentration (eavapo %) falls within a predetermined concentration range (between the concentration A and the concentration B inclusive), the system 1 can supply a necessary amount of air and a necessary amount of purge gas for the GPF regeneration process to the catalyst 82. Even when the bed temperature of the catalyst 82 is low, therefore, the particulates trapped and accumulated in the catalyst 82 are reliably allowed to burn and thus effectively removed from the catalyst 82. Even in an operating state other than fuel cut, the GPF regeneration process can be carried out.

Thereafter, the ECU 12 takes a time for supply of air ("air supply time") (trro2) to the catalyst 82 (step S12) and determines whether or not the air supply time (trro2) has not passed beyond a predetermined time R (step S13). When the air supply time (trro2) has not passed beyond the predetermined time R (S13: YES), a restart gradual change flag is set to 0 (step S14). When it has passed beyond the predetermined time R (S13: NO), the restart gradual change flag is set to 1 (step S15).

The restart gradual change flag is a flag for determining whether or not it is necessary to perform a restart gradual change control in which the opening degree of the purge valve 52 is gradually opened to a predetermined opening degree when the GPF regeneration process is terminated and then the intake-side purge is restarted. Herein, while the exhaust-side purge is being performed during the GPF regeneration process, the intake-side purge is stopped and the purge concentration learning process is not performed. Thus, when the air supply time (trro2) has passed beyond the predetermined time R, the purge concentration at the restart of intake-side purge may have largely changed from the purge concentration at the start of exhaust-side purge. If the purge concentration has largely changed, an amount of fuel to be supplied to the engine 11 may greatly deviate from a request value when the intake-side purge is restarted. In the present embodiment, therefore, it is determined from the restart gradual change flag whether or not execution of the restart gradual change control is necessary and then the restart gradual change control is executed. This can prevent large deviation of the amount of fuel to be supplied to the engine 11 from the request value when the intake-side purge is restarted.

Figure 6:
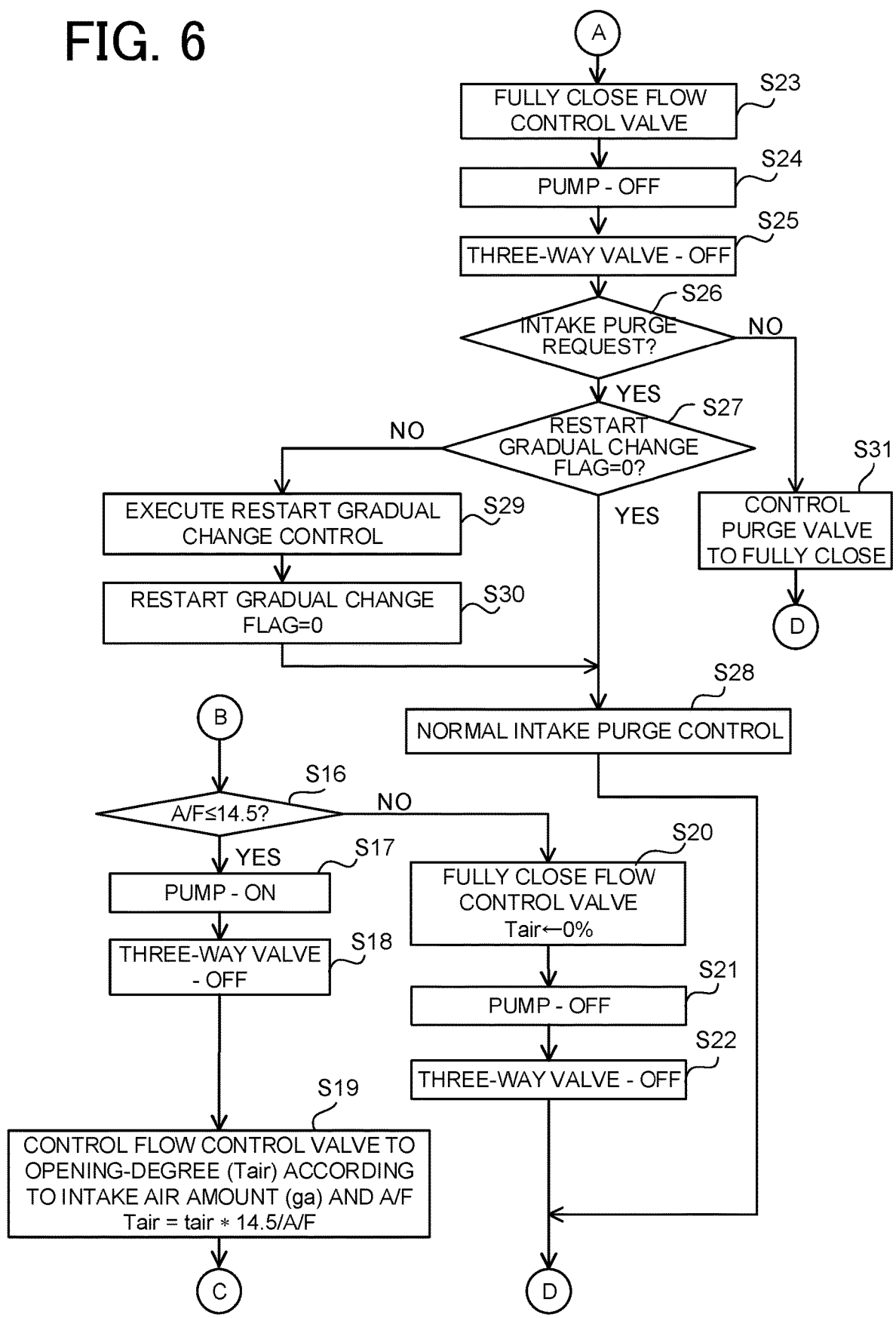
FIG. 6 is a control flowchart showing contents of regeneration control of a catalyst of which a bed temperature is high and control contents in an example where a GPF regeneration request is absent.

On the other hand, when the estimated bed temperature (rrcattemp) of the catalyst 82 is 500° C. or more (S4: NO), only air is supplied to the catalyst 82, so that the particulates trapped in the catalyst 82 can be completely burnt. Therefore, the ECU 12 determines whether or not the air-fuel ratio (A/F) is equal to or lower than 14.5 (step S16) as shown in FIG. 6. The ECU 12 controls each of the three-way valve 63, the pump 64, and the flow control valve 67 according to the air-fuel ratio (A/F) to supply an appropriate amount of air to the catalyst 82.

Specifically, when the air-fuel ratio (A/F) is 14.5 or less (S16: YES), which indicates that air supply to the catalyst 82 is needed, the ECU 12 turns the pump 64 ON (step S17) and turns the three-way valve 63 OFF (the atmosphere open state) (step S18). The ECU 12 controls the opening degree of the flow control valve 67 based on the intake air amount (ga) and the air-fuel ratio (A/F) (step S19). To be concrete, the final opening degree (Tair) of the flow control valve 67 is determined in such a manner that a basic opening degree (tair) is decided based on the intake air amount (ga) (see FIG. 3) and this basic opening degree (tair) is corrected with the fuel-air ratio (A/F). In other words, the final opening degree (Tair) of the flow control valve 67 is determined by the following expression.

$$Tair = tair \times 14.5/(A/F)$$

As described above, when the estimated bed temperature (rrcattemp) of the catalyst 82 is 500° C. or more and the air-fuel ratio (A/F) is 14.5 or less, the system 1 can reliably supply a necessary amount of air for the GPF regeneration process according to the air-fuel ratio (A/F). This causes no shortage of air to be supplied to the catalyst 82 during the GPF regeneration process. Thus, the particulates trapped and accumulated in the catalyst 82 are reliably caused to burn and effectively removed from the catalyst 82. Even during an operating state other than fuel cut, the GPF regeneration process can be carried out.

At that time, the catalyst 82 is supplied with no purge gas from the canister 47, but supplied with only air through the pump 64. Thus, all the purge gas is supplied to the intake-side purge passage 51. This can prevent deterioration in fuel consumption during the GPF regeneration process.

On the other hand, if the air-fuel ratio (A/F) exceeds 14.5 (S16: NO), a necessary amount of air for the GPF regeneration process is supplied from the engine 11 to the catalyst 82. Accordingly, the pump 64 does not need to supply air to the catalyst 82. The ECU 12 therefore fully closes the flow control valve 67 (step S20), turns the pump 64 OFF (step S21), and turns the three-way valve 63 OFF (the atmosphere open state) (step S22).

If the GPF regeneration request is not present (S1: NO), the ECU 12 fully closes the flow control valve 67 (step S23), turns the pump 64 OFF (step S24), and turns the three-way valve 63 OFF (the atmosphere open state) (step S25). Then, the ECU 12 determines whether or not a request for intake-side purge is present (step S26).

If the request for intake-side purge is present (S26: YES), the ECU 12 determines whether or not the restart gradual change flag is 0 (step S27). When the restart gradual change flag is 0 (S27: YES), the ECU 12 performs the opening degree control of the purge valve 52 in execution of the normal intake-side purge (step S28). In contrast, when the restart gradual change flag is 1 (S27: NO), the ECU 12 performs the restart gradual change control (step S29) and sets the restart gradual change flag to 0 (step S30), and then performs the opening degree control of the purge valve 52 during execution of the normal intake-side purge (step S28). This can reliably prevent large deviation of the amount of fuel to be supplied to the engine from the request value when the intake-side purge is restarted. If the intake-side purge request is not present (S26: NO), the ECU 12 fully closes the purge valve 52 (step S31).

Herein, under the conditions that: the GPF regeneration request is present; the estimated bed temperature (rrcattemp) of the catalyst 82 is less than 500° C.; and the purge concentration (eavapo %) is less than the predetermined concentration A (S6: NO), no purge gas is allowed to be supplied from the canister 47 to the catalyst 82. The ECU 12 therefore controls the engine 11 at a rich air-fuel ratio to perform the GPF regeneration process. Specifically, the ECU 12 performs the GPF regeneration control based on a control flowchart shown in FIG. 7.

Figure 7:
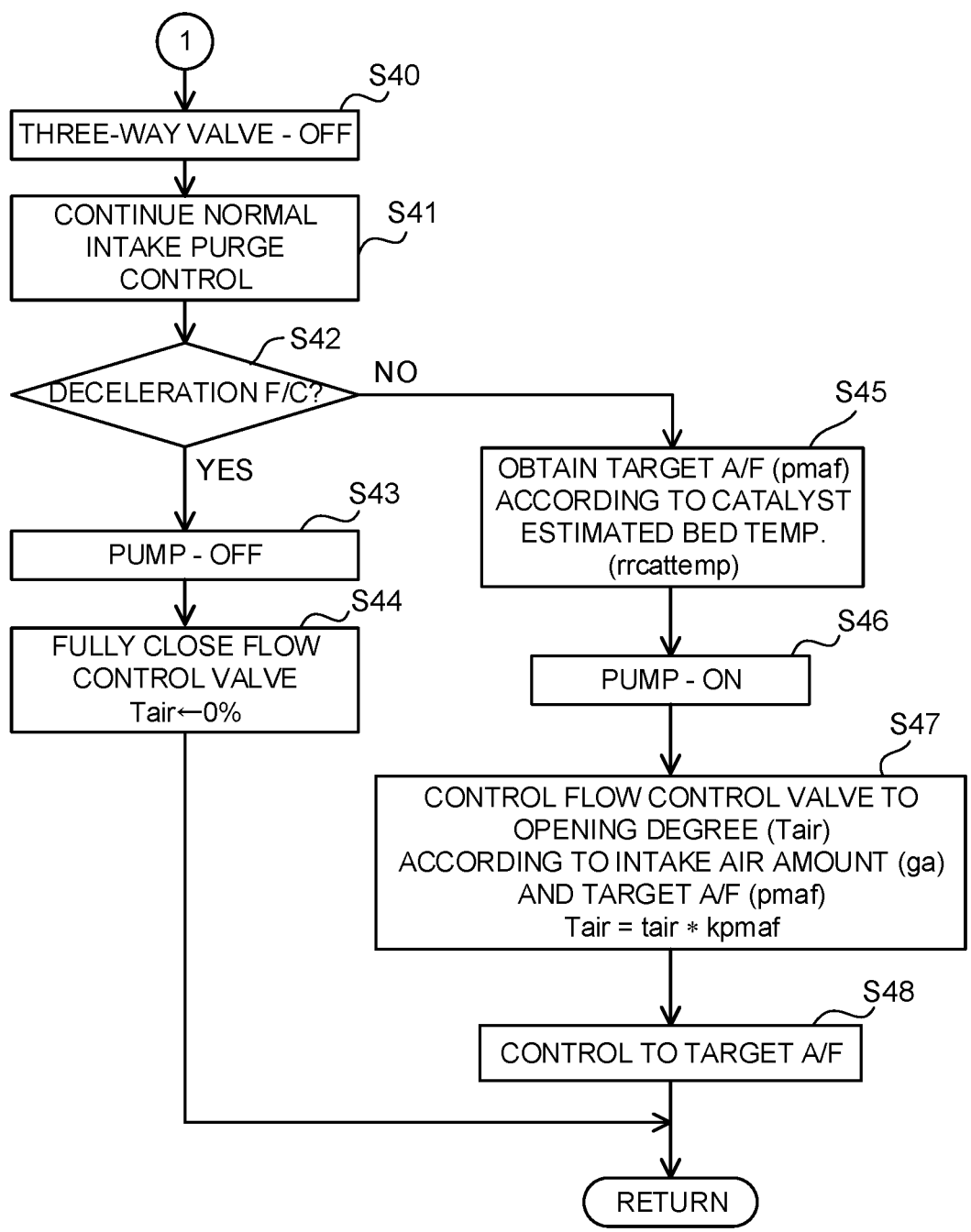
FIG. 7 is a control flowchart showing contents of regeneration control of a catalyst at a low purge concentration.

As shown in FIG. 7, firstly, the ECU 12 turns the three-way valve 63 OFF (the atmosphere open state) (step S40) and continues the opening degree control of the purge valve 52 during the normal intake-side purge (step S41). The ECU 12 then determines whether or not fuel cut for deceleration ("deceleration fuel cut") is being executed (step S42). If the deceleration fuel cut is being executed (S42: YES), the ECU 12 turns the pump 64 OFF (step S43) and fully closes the flow control valve 67 (step S44).

Figure 8:
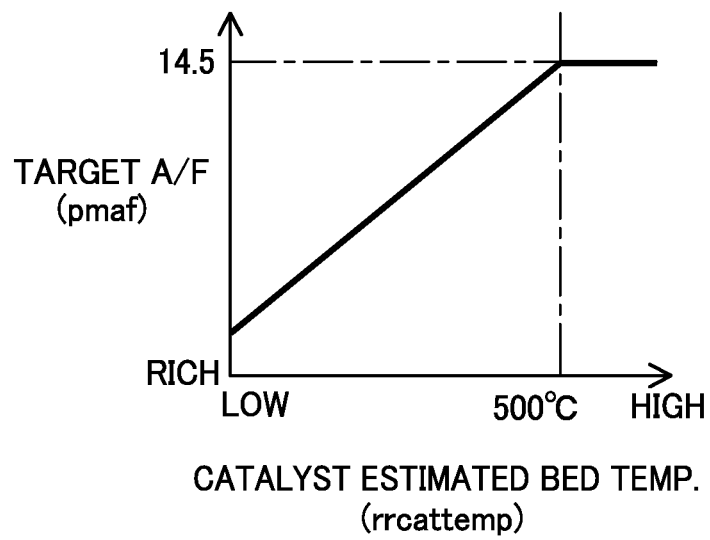
FIG. 8 is a data map showing a relationship between a target A/F and a catalyst estimated bed temperature.

If the deceleration fuel cut is not being executed (S42: NO), the ECU 12 determines a target A/F (pmaf) from a data map shown in FIG. 8 based on the estimated bed temperature (rrcattemp) of the catalyst 82 to supply unburnt gas needed for the GPF regeneration process from the engine 11 to the catalyst 82. This data map is previously specified by an experiment and others and stored in advance in the ECU 12. Subsequently, the ECU 12 turns the pump 64 ON (step S46) and controls the opening degree of the flow control valve 67 based on the intake air amount (ga) and the target A/F (pmf) (step S47). Specifically, the final opening degree (Tair) of the flow control valve 67 is finally determined in such a manner that a basic opening degree (tair) is decided based on the intake air amount (ga) (see FIG. 3) and this basic opening degree (tair) is multiplied by an opening degree correction coefficient (kpmaf) determined based on the target A/F (pmaf). In other words, the final opening degree (Tair) of the flow control valve 67 is determined by the following expression.

$$Tair = tair \times kpmaf$$

Figure 9:
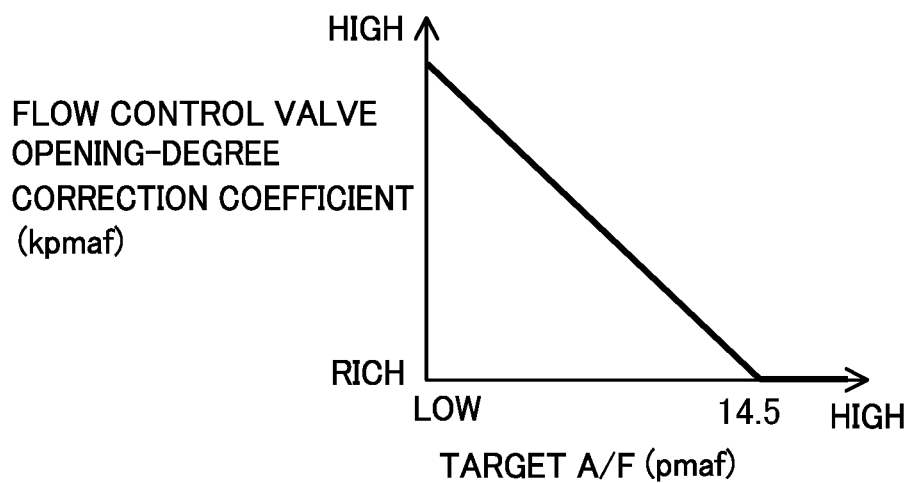
FIG. 9 is a data map showing a relationship between an opening degree correction coefficient and a target A/F.

The correction coefficient (kmaf) according to the target A/F (pmaf) is determined to be larger as the target A/F (pmaf) is lower than 14.5 as shown in FIG. 9. The relationship plotted in FIG. 9 is previously specified as a data map by an experiment and others and stored in advance in the ECU 12.

Thereafter, the ECU 12 continues the rich control of the engine 11 to obtain a target A/F (step S48). As described above, when the estimated bed temperature (rrcattemp) of the catalyst 82 is less than 500° C. and also in the low purge concentration state where the purge concentration (eavapo %) is less than the predetermined concentration A, unburnt gas is supplied from the engine 11 under the rich control to the catalyst 82. Further, the three-way valve 63 is brought in the atmosphere open state and thus air is supplied by the pump 64 to the catalyst 82. Accordingly, even in the low purge concentration state where a necessary amount of purge gas is not allowed to be supplied from the canister 47 to the catalyst 82, the particulates trapped and accumulated in the catalyst 82 are reliably burnt.

Furthermore, under the conditions that: the GPF regeneration request is present; the estimated bed temperature (rrcattemp) of the catalyst 82 is less than 500° C.; and the purge concentration (eavapo %) exceeds the predetermined concentration B % (S8: NO), high-concentration purge gas is supplied to the catalyst 82 and thus the purge gas may not be completely burnt in the catalyst 82. In other words, unburnt gas may be released to the atmosphere. For this reason, when purge gas is to be supplied from the canister 47 to the catalyst 82, the ECU 12 performs the GPF regeneration process while carrying out ON/OFF switching control to alternately switch the three-way valve 63 ON and OFF at a predetermined ratio determined according to the concentration of purge gas at constant time intervals to dilute the purge concentration. Specifically, the ECU 12 performs the GPF regeneration control based on a control flowchart shown in FIG. 10.

Figure 10:
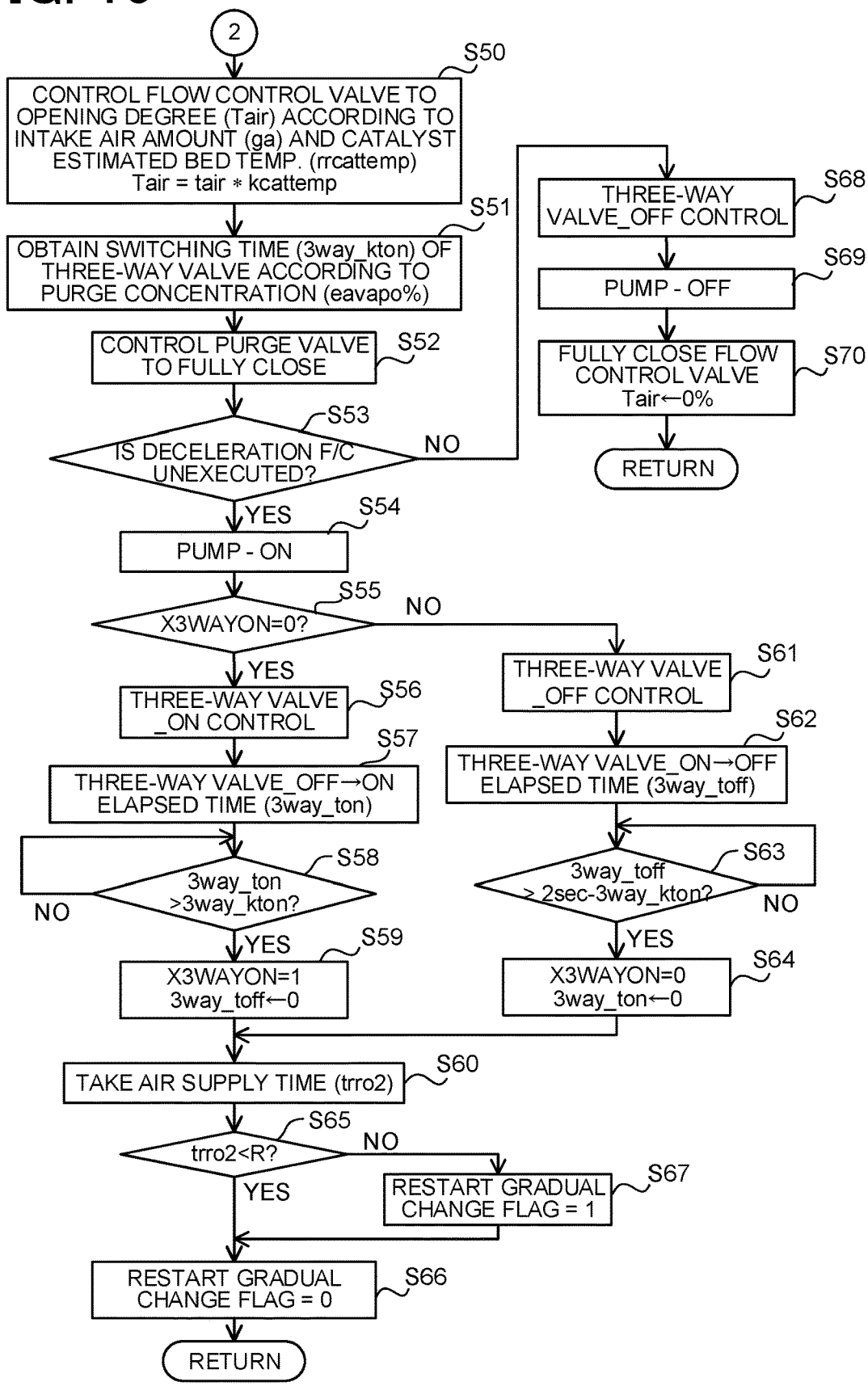
FIG. 10 is a control flowchart showing contents of regeneration control of a catalyst at a high purge concentration.

As shown in FIG. 10, firstly, the ECU 12 controls the opening degree of the flow control valve 67 based on the intake air amount (ga) and the estimated bed temperature (rrcattemp) of the catalyst 82 (step S50). Specifically, the opening degree of the flow control valve 67 is finally determined in such a manner that a basic opening degree (tair) is decided based on the intake air amount (ga) and this basic opening degree (tair) is multiplied by a correction coefficient (kcattemp) determined by the catalyst estimated bed temperature (rrcattemp). In other words, the final opening degree (Tair) of the flow control valve 67 is determined by the following expression.

$$Tair = tair \times kcattemp$$

Figure 11:
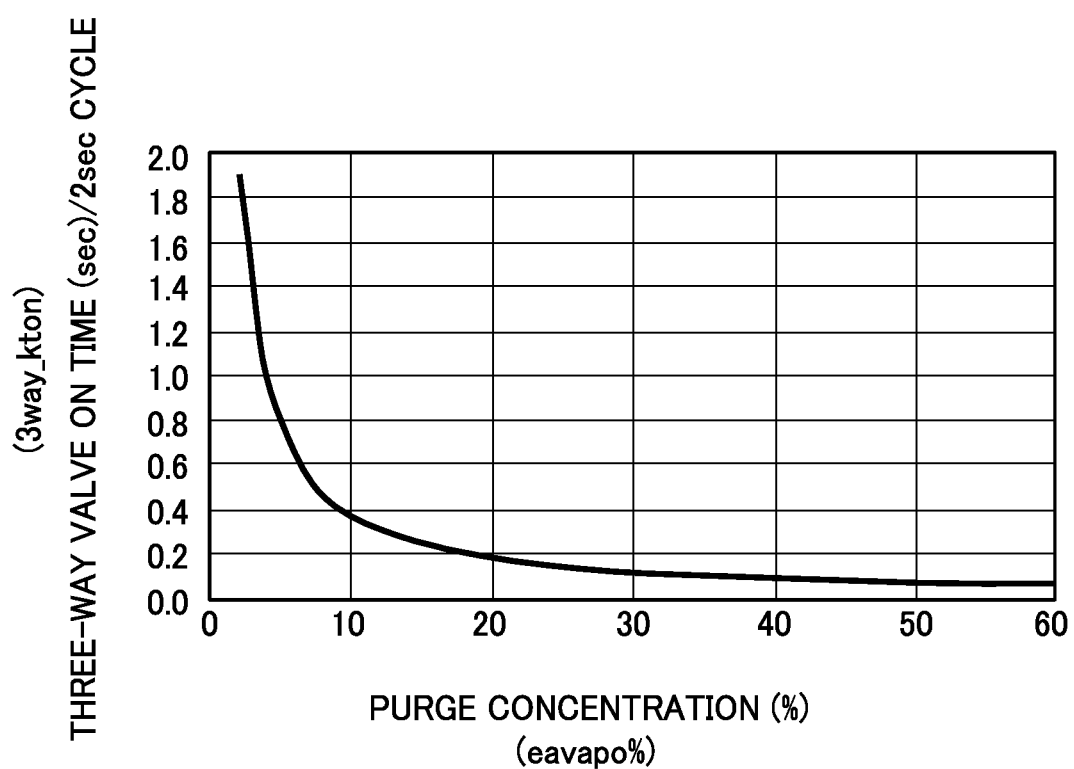
FIG. 11 is a data map showing a ratio of ON time of a three-way valve to a purge concentration (a ratio in 2 seconds)

Subsequently, the ECU 12 determines a switching time (3way_kton) of the three-way valve 63 according to the purge concentration (eavapo %) (step S51) and fully closes the three-way valve 52 (step S52). In the present embodiment, the switching time (3way_kton) of the three-way valve 63 is determined so that the ratio of ON time (the ratio in 2 seconds) is gradually smaller as the purge concentration (eavapo %) is higher as shown in FIG. 11. A data map shown in FIG. 11 is previously specified by an experiment and others and stored in the ECU 12 in advance.

When the deceleration fuel cut is unexecuted (step S53: YES), the ECU 12 turns the pump 64 ON (step S54) and performs the following ON/OFF switching control of the three-way valve 63. Specifically, the ECU 12 determines first whether or not a request for turning the three-way valve 63 ON ("ON request") is present (step S55). This determination is made based on whether or not an end-of-ON flag X3WAYON is 0. It is determined that the ON request is present when the flag X3WAYON is 0, but the ON request is absent when the flag X3WAYON is 0.

When the ON request for the three-way valve 63 is present (S55: YES), the ECU 12 turns the three-way valve 63 ON (the communication state) (step S56) and measures an ON elapsed time (3way_ton) from when the valve 63 is turned ON from OFF (step S57). When the ON elapsed time (3way_ton) exceeds the switching time (3way_kton) (step S58: YES), thereafter, the ECU 12 determines that the ON time allocated within 2 seconds has elapsed and sets the flag X3WAYON to 1 and further resets an OFF elapsed time (3way_toff) from when the valve 63 is turned OFF from ON (step S59). The ECU 12 further takes an air supply time (trro2) to the catalyst 82 (step S60).

In contrast, when the ON request for the three-way valve 63 is not present (S55: NO), the ECU 12 turns the three-way valve 63 OFF (the atmosphere open state) (step S61) and measures the OFF elapsed time (3way_toff) from when the valve 63 is turned OFF from ON (step S62). When the OFF elapsed time (3way_toff) exceeds a determination time (2 sec-3way_kton) (step S63: YES), subsequently, the ECU 12 determines that the OFF time allocated within 2 seconds has elapsed and sets the flag X3WAYON to 0 and also resets the ON elapsed time (3way_ton) from turn-ON from OFF (step S64). The ECU 12 further takes the air supply time (trro2) to the catalyst 82 (step S60).

As described above, when the estimated bed temperature (rrcattemp) of the catalyst 82 is less than 500° C. and also in the high purge concentration state where the purge concentration (eavapo %) exceeds the concentration B %, the three-way valve 63 is alternately switched between ON (the communication state) and OFF (the atmosphere open state) at a predetermined ratio determined according to the concentration of the purge gas at constant time intervals (every 2 seconds in the present embodiment). This ON/OFF switching control of the three-way valve 63 is repeated at intervals of 2 seconds. Thus, the purge gas is diluted and supplied to the catalyst 82, thereby preventing generation of unburnt gas due to excessive supply of purge gas. Accordingly, the system 1 can reliably burn the particulates trapped and accumulated in the catalyst 82 without generating unburnt gas.

Further, the ECU 12 takes the air supply time (trro2) to the catalyst 82 and then determines whether or not the air supply time (trro2) has elapsed a predetermined time R (step S65). When the air supply time (trro2) has not elapsed beyond the predetermined time R (S65: YES), the ECU 12 sets the restart gradual change flag to 0 (step S66). When it has elapsed beyond the predetermined time R (S65: NO), the ECU 12 sets the restart gradual change flag to 1 (step S67).

When the deceleration fuel cut is being executed (step S53: NO), the ECU 12 turns the three-way valve 63 OFF (step S68), turns the pump 64 OFF (step S69), and fully closes the flow control valve 67 (step S70).

Figure 12:
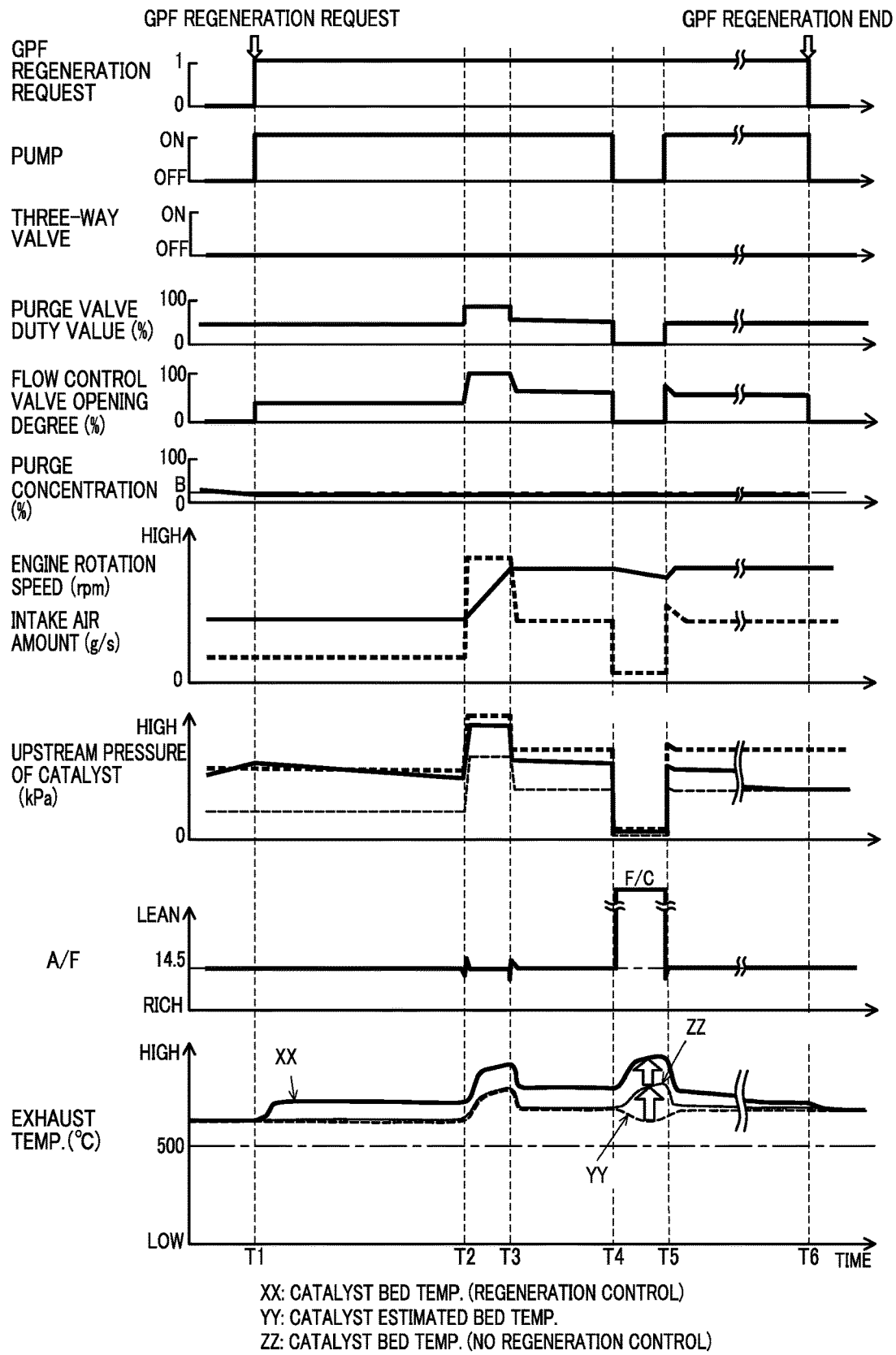
FIG. 12 is a time chart during execution of regeneration control of catalyst at a high temperature.
Figure 13:
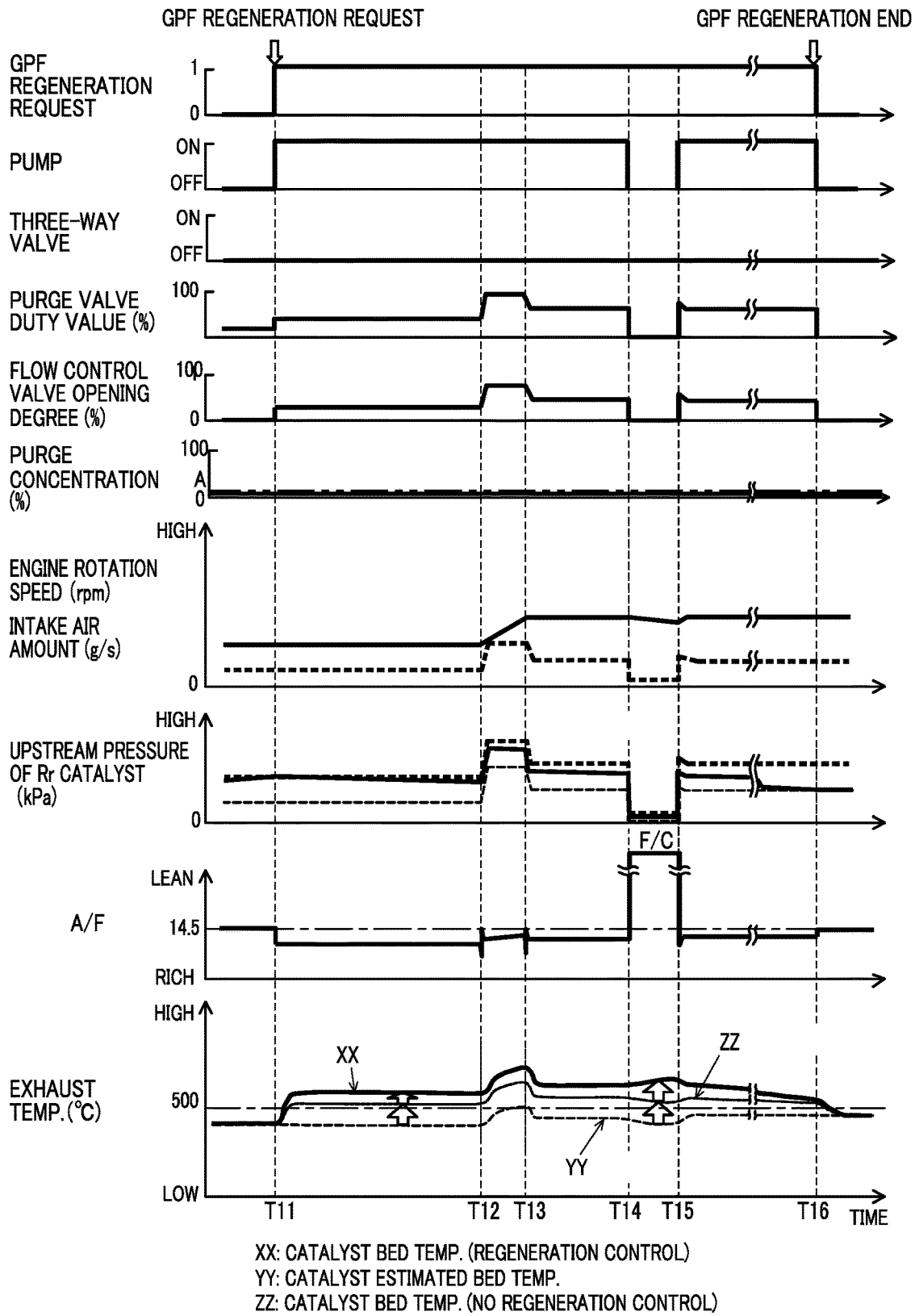
FIG. 13 is a time chart during execution of regeneration control of catalyst at a low temperature and a low purge concentration.
Figure 14:
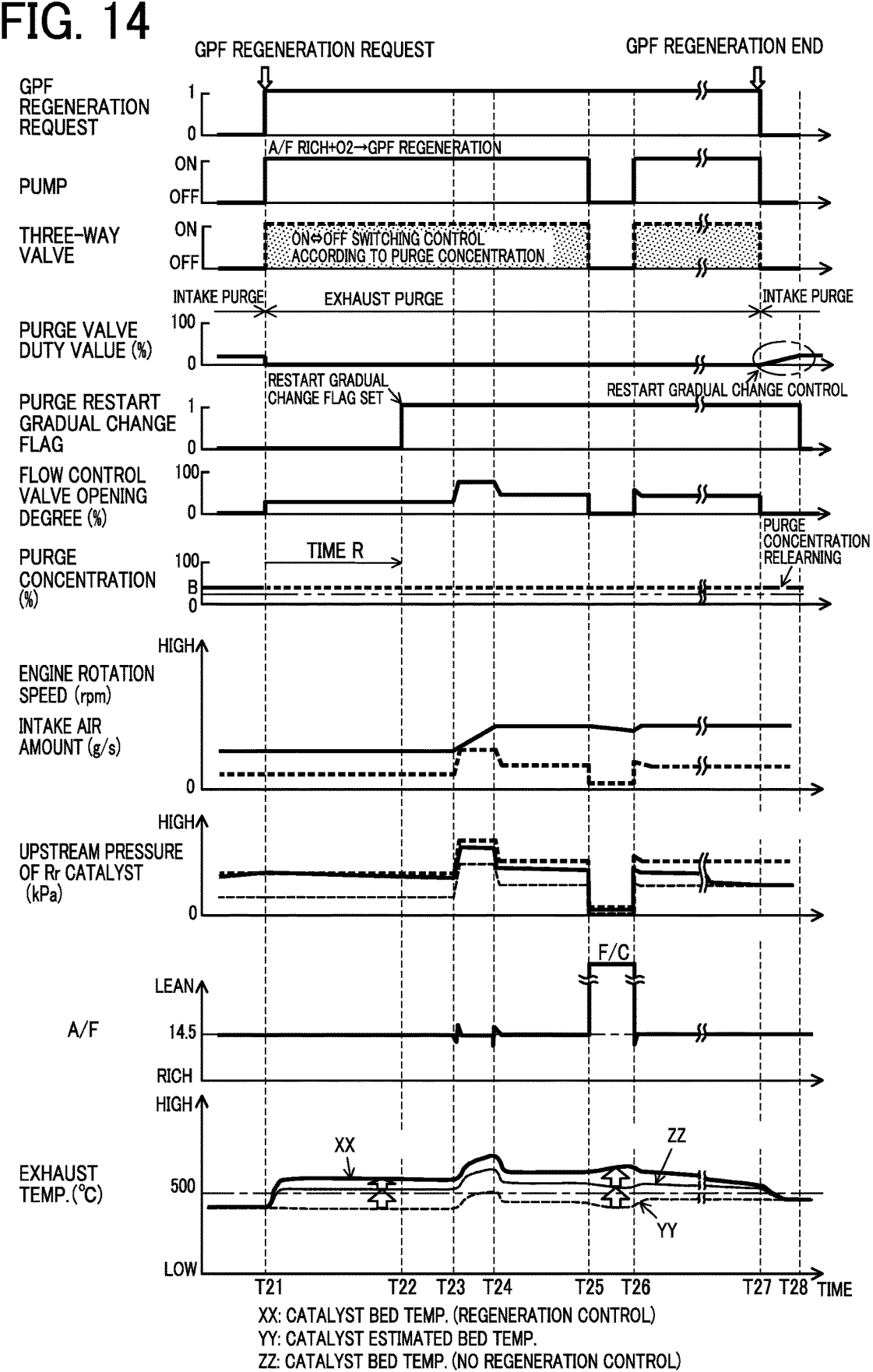
FIG. 14 is a time chart during execution of regeneration control of catalyst at a low temperature and a high purge concentration.

When the foregoing control based on the control flowchart is performed by the ECU 12, for example, the controls appearing in control time charts in FIGS. 12 to 14 are carried out. FIG. 12 is a time chart during the GPF regeneration process in which the estimated bed temperature (rrcattemp) of the catalyst 82 is 500° C. or more. FIG. 13 is a time chart during the GPF regeneration process in which the estimated bed temperature (rrcattemp) of the catalyst 82 is less than 500° C. and in the low purge concentration. FIG. 14 is a time chart during GPF regeneration process in which the estimated bed temperature (rrcattemp) of the catalyst 82 is less than 500° C. and in the high purge concentration.

In the GPF regeneration process in which the the estimated bed temperature (rrcattemp) of the catalyst 82 is 500° C. or more, as shown in FIG. 12, the front, i.e. upstream, pressure of the catalyst 82 exceeds the determination pressure (see a thick broken line) at time T1, so that the GPF regeneration request occurs. At that time, the air-fuel ratio (A/F) is 14.5. Thus, the pump 64 is turned ON and the three-way valve 63 is turned OFF (the atmosphere open state). Furthermore, the opening degree of the flow control valve 67 is controlled basically according to the intake air amount (ga). This allows a necessary amount of air to be supplied to the catalyst 82, so that the GPF regeneration process is executed to burn the particulates accumulated in the catalyst 82. This GPF regeneration process causes the exhaust temperature (the bed temperature of the catalyst 82) to rise. It is to be noted that the intake-side purge continues and the purge concentration learning process is being performed.

When acceleration operation is performed from time T2 to T3, the intake air amount (ga) increases and correspondingly the opening degree of the flow control valve 67 increases, resulting in an increase in the amount of air to be supplied to the catalyst 82 through the pump 64. In contrast, when the deceleration fuel cut is executed from time T4 to T5, the pump 64 is turned OFF and the flow control valve 67 is fully closed. Accordingly, during the deceleration fuel cut in which a sufficient amount of air is supplied from the engine 11 to the catalyst 82, no air is supplied to the catalyst 82 through the pump 64.

After that, the upstream pressure of the catalyst 82 falls below the determination pressure (a thin broken line) at time T6 and the GPF regeneration process is completed. Thus, the pump 64 is turned OFF and the flow control valve 67 is fully closed, so that air supply to the catalyst 82 by the pump 64 is stopped.

In the GPF regeneration process in which the estimated bed temperature (rrcattemp) of the catalyst 82 is less than 500° C. and the purge concentration is low, as shown in FIG. 13, the upstream pressure of the catalyst 82 exceeds the determination pressure (a thick broken line) at time T1, so that the GPF regeneration request occurs. At that time, the purge concentration is lower than the predetermined concentration A and thus the engine 11 is operated under the rich control. The air-fuel ratio A/F is therefore smaller than 14.5. Thus, the pump 64 is turned ON and the three-way valve 63 is turned OFF (the atmosphere open state). The opening degree of the flow control valve 67 is controlled basically according to the intake air amount (ga). Accordingly, the catalyst 82 is supplied with unburnt gas from the engine 11 and also a necessary amount of air, so that the GPF regeneration process is executed to burn the particulates accumulated in the catalyst 82. This GPF regeneration process causes the exhaust temperature (the bed temperature of the catalyst 82) to rise. To be specific, burning of the unburnt gas supplied by the rich control causes the exhaust temperature to rise up to the catalyst bed temperature (with no regeneration control) and burning of the particulates by the regeneration process causes the exhaust temperature to rise up to the catalyst bed temperature (with regeneration control). It is to be noted that the intake-side purge continues and the purge concentration learning process is performed.

When the acceleration operation is performed from time T12 to T13, the intake air amount (ga) increases and accordingly the opening degree of the flow control valve 67 increases, resulting in an increase in the amount of air to be supplied to the catalyst 82 through the pump 64. During this period, the engine 11 is also operated under the rich control. In contrast, when the deceleration fuel cut is performed from time T14 to T15, the pump 64 is turned OFF and the flow control valve 67 is fully closed. During the deceleration fuel cut in which a sufficient amount of air is supplied from the engine 11 to the catalyst 82, accordingly, no air is supplied to the catalyst 82 through the pump 64.

After that, the upstream pressure of the catalyst 82 falls below the determination pressure (a thin broken line) at time T16 and the GPF regeneration process is completed. Thus, the pump 64 is turned OFF and the flow control valve 67 is fully closed, so that air supply to the catalyst 82 by the pump 64 is stopped.

In the GPF regeneration process in which the estimated bed temperature (rrcattemp) of the catalyst 82 is less than 500° C. and the purge concentration is high, as shown in FIG. 14, the upstream pressure of the catalyst 82 exceeds the determination pressure (a thick broken line) at time T21, so that the GPF regeneration request occurs. At that time, the purge concentration is higher than the predetermined concentration B and thus the three-way valve 63 is operated under the ON/OFF switching control. Further, the pump 64 is turned ON and the opening degree of the flow control valve 67 is controlled basically based on the intake air amount (ga). Accordingly, the catalyst 82 is supplied with the high-concentration purge gas from the canister 47 while the purge gas is diluted and also a sufficient amount of air. This GPF regeneration process is executed to burn the particulates accumulated in the catalyst 82. This GPF regeneration process causes the exhaust temperature (the bed temperature of the catalyst 82) to rise. To be specific, burning of the purge gas causes the exhaust temperature to rise up to the catalyst bed temperature (with no regeneration control) and burning of the particulates by the regeneration process causes the exhaust temperature to rise up to the catalyst bed temperature (with regeneration control). It is to be noted that the intake-side purge is stopped and the purge concentration learning process is also interrupted.

At time T22 after a lapse of a predetermined time R from time T21, the restart gradual change flag is set to 1. When acceleration operation is performed from time T23 to T24, the intake air amount (ga) increases and correspondingly the opening degree of the flow control valve 67 also increases, resulting in an increase in the amount of air to be supplied to the catalyst 82 through the pump 64. During this period, the three-way valve 63 is being controlled to switch between ON and OFF. In contrast, when the deceleration fuel cut is performed from time T25 to T26, the three-way valve 63 is turned OFF. Further, the pump 64 is turned OFF and the flow control valve 67 is fully closed. Accordingly, during the deceleration fuel cut in which a sufficient amount of air is supplied from the engine 11 to the catalyst 82, no air is supplied to the catalyst 82 through the pump 64.

After that, the upstream pressure of the catalyst 82 falls below the determination pressure (a thin broken line) at time T27, the GPF regeneration process is completed. Then, the three-way valve 63 is turned OFF. Further, the pump 64 is turned OFF and the flow control valve 67 is fully closed. Thus, air supply to the catalyst 82 through the pump 64 is completed. At that time, while the purge valve 52 is controlled to gradually change, i.e., subjected to gradual change control, the learning process of purge concentration is restarted and the intake-side purge is restarted. After the end of the gradual change control of the purge valve 52 at time T28, normal intake-side purge control is performed based on the purge concentration obtained by the learning process. When the GPF regeneration process is completed and then the intake-side purge is restarted, accordingly, the amount of fuel to be supplied to the engine 11 does not largely deviate from the request value. Thus, the engine 11 can be stoichiometrically controlled.

According to the exhaust purification system 1 in the present embodiment described above, when the GPF regeneration request occurs, the system 1 can reliably supply a necessary amount of air and a necessary amount of purge gas or unburnt gas for the catalyst 82 according to the current operating state of the engine 11. Consequently, when the GPF regeneration request occurs, the system 1 can reliably burn the particulates accumulated in the catalyst 82 and effectively remove them.

<Hole Detection in Purge Passage>

Figure 15:
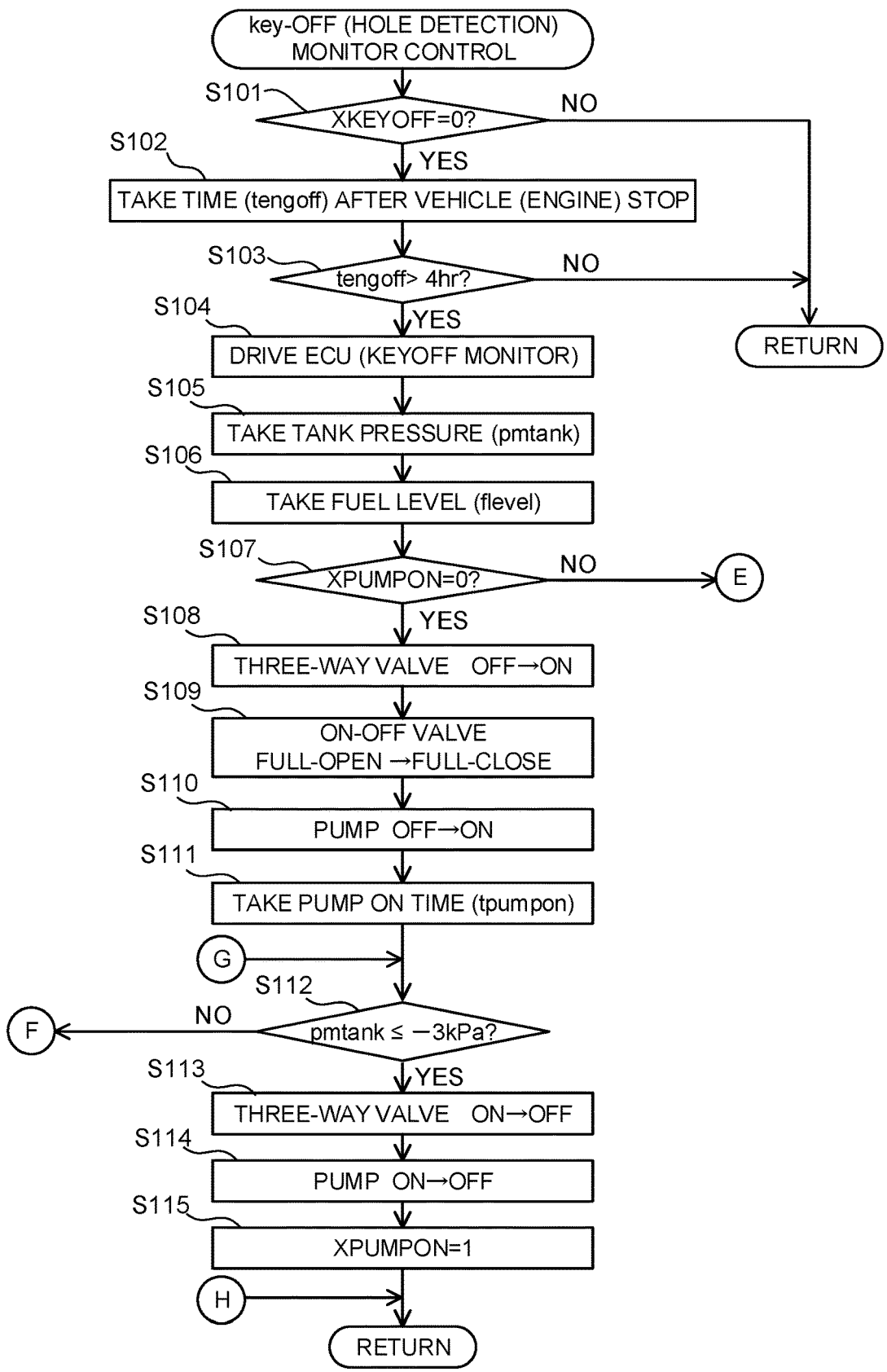
FIG. 15 is a control flowchart showing contents of hole detection control.

Herein, in the exhaust purification system 1, purge gas is supplied to the intake passage 21 through the intake-side purge passage 51 (Intake-side purge) and also purge gas is supplied to the catalyst 82 through the exhaust-side purge passage 61 (Exhaust-side purge). Therefore, in case a hole or holes are perforated in the intake-side purge passage 51 or the exhaust-side purge passage 61, purge gas may leak through the hole(s) to the atmosphere. Thus, it is necessary to early detect hole abnormality in the purge passages 51 and 61. In the present embodiment, therefore, the detection of a hole(s) ("hole detection") in the purge passages 51 and 61 is performed. Specifically, when key-off monitor control is uncompleted, the ECU 12 performs a control for hole detection based on a control flowchart shown in FIG. 15.

The ECU 12 first determines whether or not the key-off monitor control is uncompleted (step S101). This determination is made based on whether or not a key-off monitor completion flag XKEYOFF is 0. The key-off monitor is determined to be uncompleted when the flag XKEYOFF is 0 but to be completed when the flag XKEYOFF is 1. When the key-off monitor is uncompleted (S101: YES), the ECU 12 takes an elapsed time (tengoff) from stop of a vehicle (an engine) (step S102). When the key-off monitor control is completed (S101: NO), the above process routine is terminated.

If the elapsed time (tengoff) from engine stop exceeds 4 hours (step S103: YES), the ECU 12 judges that a key-off monitor condition is established, and the ECU 12 is driven to start the key-off monitor (hole detection) (step S104). Then, the ECU 12 takes the pressure (pmtank) and the fuel level (flevel) in the fuel tank 43 respectively from the tank pressure sensor 44 and the fuel level gage 45 (steps S105, S106). If the elapsed time (tengoff) from engine stop is less than 4 hours (step S103: NO), the above process routine is terminated.

The ECU 12 further determines whether or not a predetermined negative pressure is introduced into the fuel tank 43 (the purge passages 51, 61) (step S107). This determination is made based on whether or not a negative-pressure introduction completion flag XPUMPON is 0. The negative-pressure introduction is determined to be uncompleted when the flag XPUMPON is 0 but to be completed when the flag XPUMPON is 1.

If the introduction of negative pressure into the fuel tank 43 is uncompleted (S107: YES), the ECU 12 turns the three-way valve 63 ON (step S108). The purge valve 52 is in a full-closed state at stop of the engine 11. The ECU 12 further fully closes the on-off valve 49 and turns the pump 64 ON (steps S109, S110). The ECU 12 takes an ON time (tpumpon) of the pump 64 (step S111).

Herein, during negative-pressure introduction, vapor (evaporated fuel) in the fuel tank 43 and purge gas (evaporated fuel) from the canister 47 are caused to flow in the exhaust passage 25. This exhaust passage 25 is in communication with atmosphere and hence the evaporated fuel may be directly released to the atmosphere. In the present embodiment, however, the trap canister 62 is provided at an upstream position in the exhaust-side purge passage 61 so that the purge gas from the canister 47 (including the vapor in the fuel tank 43) is trapped in the trap canister 62. This prevents direct release of the purge gas from the canister 47 (including the vapor in the fuel tank 43) to the atmosphere.

The ECU 12 subsequently determines whether or not the pressure (pmtank) in the fuel tank 43 is equal to or less than −3 kPa (step S112). If the pressure (pmtank) in the fuel tank 43 is −3 kPa or lower (S112: YES), the ECU 12 judges that negative-pressure introduction is completed and thus turns the three-way valve 63 from ON to OFF, turns the pump 64 from ON to OFF, and sets the flag XPUMPON to 1 (steps S113 to S115).

Figure 16:
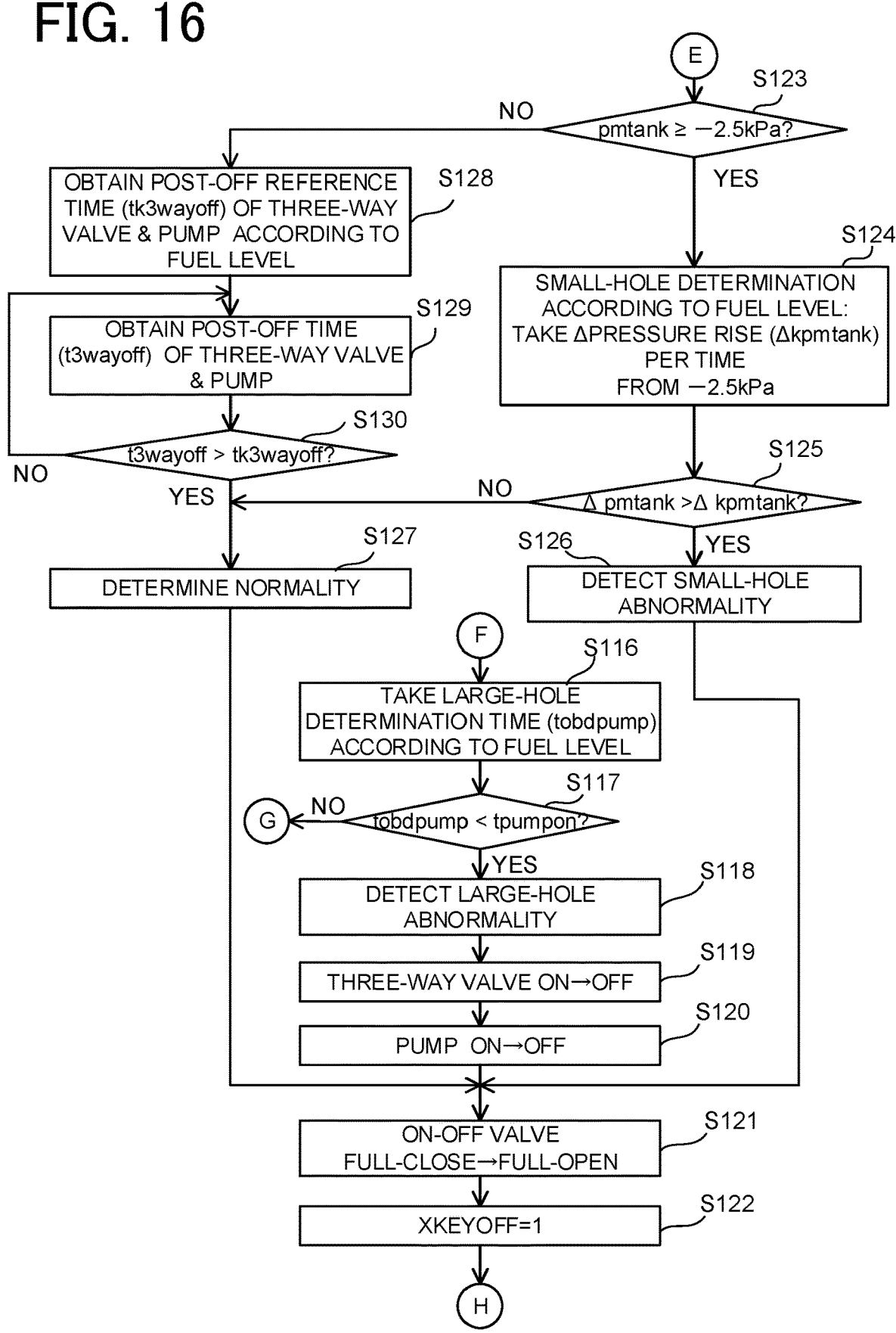
FIG. 16 is a control flowchart showing contents of hole detection control.
Figure 17:
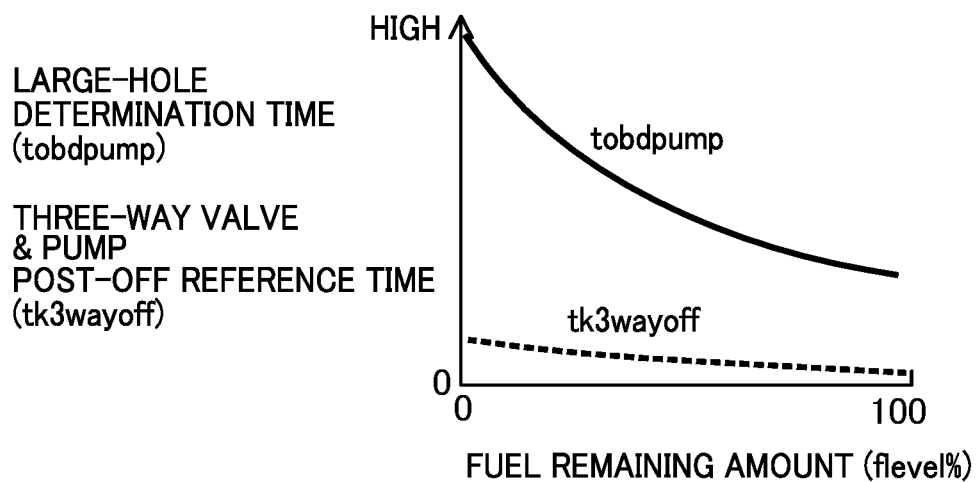
FIG. 17 is a data map showing a relationship between a large-hole determination time, a post-OFF reference time of a three-way valve and a pump, and a fuel remaining amount (a fuel level)

If the pressure (pmtank) in the fuel tank 43 is larger than −3 kPa (S112: NO), on the other hand, the ECU 12 determines a large-hole determination time (tobdpump) for performing a large-hole determination according to a fuel level (flevel) as shown in FIG. 16 (step S116). This large-hole determination time (tobdpump) is decided such that a determination time is longer as the fuel level (flevel) is lower (smaller) as shown in FIG. 17. This is because it takes long hours for the pressure in the fuel tank 43 to reach −3 kPa as the fuel remaining amount is lower. A data map shown in FIG. 17 is previously specified by an experiment and others and stored in advance in the ECU 12.

When the ON time (tpumpon) of the pump 64 exceeds the large-hole determination time (tobdpump) (step S117: YES), the ECU 12 judges that a large hole(s) exists in the intake-side purge passage 51 or the exhaust-side purge passage 61 and detects large-hole abnormality (step S118). If a large hole is perforated in the intake-side purge passage 51 or the exhaust-side purge passage 61, even when a negative pressure is applied by the pump 64, the pressure (pmtank) in the fuel tank 43 cannot be decreased down to −3 kPa. In the present embodiment, for example, a hole larger than 0.5 is detected as the large-hole abnormality.

If the ON time (tpumpon) of the pump 64 does not reach the large-hole determination time (tobdpump) (step S117: NO), the process returns to S112. If the pressure (pmtank) in the fuel tank 43 becomes equal to or lower than −3 kPa before the ON time (tpumpon) of the pump 64 exceeds the large-hole determination time (tobdpump), the ECU 12 judges that the large-hole abnormality is absent and performs a small-hole detection process mentioned later.

After detecting the large-hole abnormality, the ECU 12 turns the three-way valve 63 from ON to OFF and turns the pump 64 from ON to OFF (steps S119, S120). Further, the ECU 12 brings the on-off valve 49 from a fully closed state to a fully open state and sets the flag XKEYOFF to 1 (steps S121, S122).

If the introduction of negative pressure into the fuel tank 43 is completed (S107: NO), the ECU 12 performs the following small-hole detection process. Specifically, the ECU 12 determines whether or not the pressure (pmtank) in the fuel tank 43 is equal to or higher than −2.5 kPa (step S123). If the pressure (pmtank) in the fuel tank 43 is −2.5 kPa or higher (S123: YES), the ECU 12 performs the small-hole detection based on changes in the pressure (pmtank) in the fuel tank 43.

Figure 18:
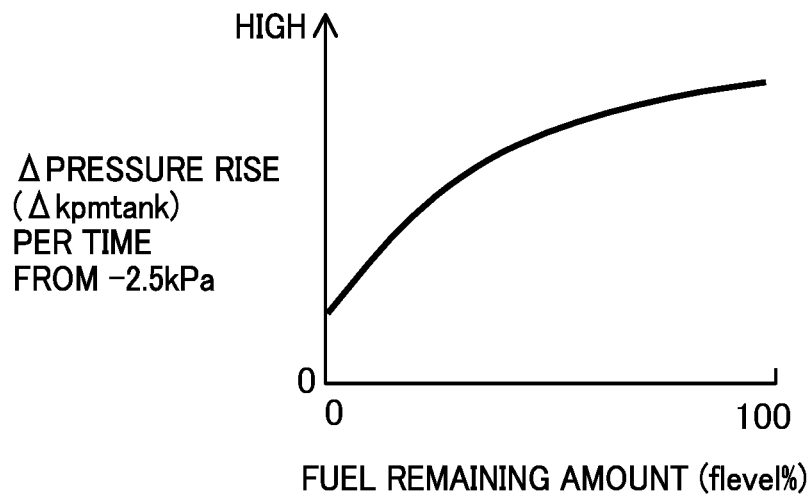
FIG. 18 is a data map showing a relationship between a pressure rise per time and a fuel remaining amount (a fuel level)

Therefore, according to the fuel level (flevel), the ECU 12 determines a pressure rise per time (Δkpmtank) from −2.5 kPa which is a reference value for performing the small-hole determination (step S124). This pressure rise per time (Δkpmtank) is decided such that the pressure rise is higher (larger) as the fuel level (flevel) is higher (greater) as shown in FIG. 18. This is because the more the fuel remaining amount, the larger the pressure rise per time if a small hole exists. A data map shown in FIG. 18 is previously specified by an experiment or others and stored in the ECU 12.

The ECU 12 determines whether or not an actual pressure rise per time (Δpmtank) from −2.5 kPa is larger than the pressure rise per time (Δkpmtank) serving as a reference for determination (step S125). If the actual pressure rise per time (Δpmtank) is larger than the pressure rise per time (Δkpmtank) serving as the reference for determination (S125: YES), the ECU 12 judges that a small hole(s) exists in the intake-side purge passage 51 or the exhaust-side purge passage 61 and detects small-hole abnormality (step S126). Then, the ECU 12 brings the on-off valve 49 from a fully closed state to a fully open state and sets the flag XKEYOFF to 1 (steps S121, S122).

In contrast, if the actual pressure rise per time (Δpmtank) is smaller than the pressure rise per time (Δkpmtank) serving as the reference for determination (S125: NO), the ECU 12 judges that no small hole exists in the intake-side purge passage 51 or the exhaust-side purge passage 61 and thus determines the passage 51 or 61 to be normal because of no hole (step S127). Thereafter, the ECU 12 brings the on-off valve 49 from the fully closed state to the fully open state and sets the flag XKEYOFF to 1 (steps S121, S122).

If the negative pressure has been completely introduced into the fuel tank 43 and the pressure in the fuel tank (pmtank) is lower than −2.5 kPa (S123: NO), the ECU 12 waits for a lapse of a predetermined time according to the fuel level (flevel) and then judges that no hole exists in the intake-side purge passage 51 or the exhaust-side purge passage 61 and thus determines the passage 51 or 61 to be normal because of no hole. To be specific, the ECU 12 determines a post-OFF reference time (tk3wayoff) which elapses from when the three-way valve 63 and the pump 64 are turned OFF according to the fuel level (flevel), the post-OFF reference time being used as a reference elapsed time for determining the normality (step S128). This post-OFF reference time (tk3wayoff) is decided such that a post-OFF time is longer as the fuel level (flevel) is lower (smaller) as shown in FIG. 17. This is because it takes long hours until the pressure in the fuel tank 43 rises up to −2.5 kPa as the fuel remaining amount is smaller. A data map shown in FIG. 17 is previously specified by an experiment and others and stored in advance in the ECU 12.

The ECU 12 obtains the post-OFF time (t3wayoff) corresponding to an actual elapsed time from when the three-way valve 63 and the pump 64 are turned OFF (step S129). This actual post-OFF time (t3wayoff) has elapsed beyond the post-OFF reference time (tk3wayoff) serving as a reference for determination (step S130: YES), the ECU 12 judges that no small hole exists in the intake-side purge passage 51 and the exhaust-side purge passage 61 and determines the passages 51 and 61 to be normal because of no small hole (step S127).

Figure 19:
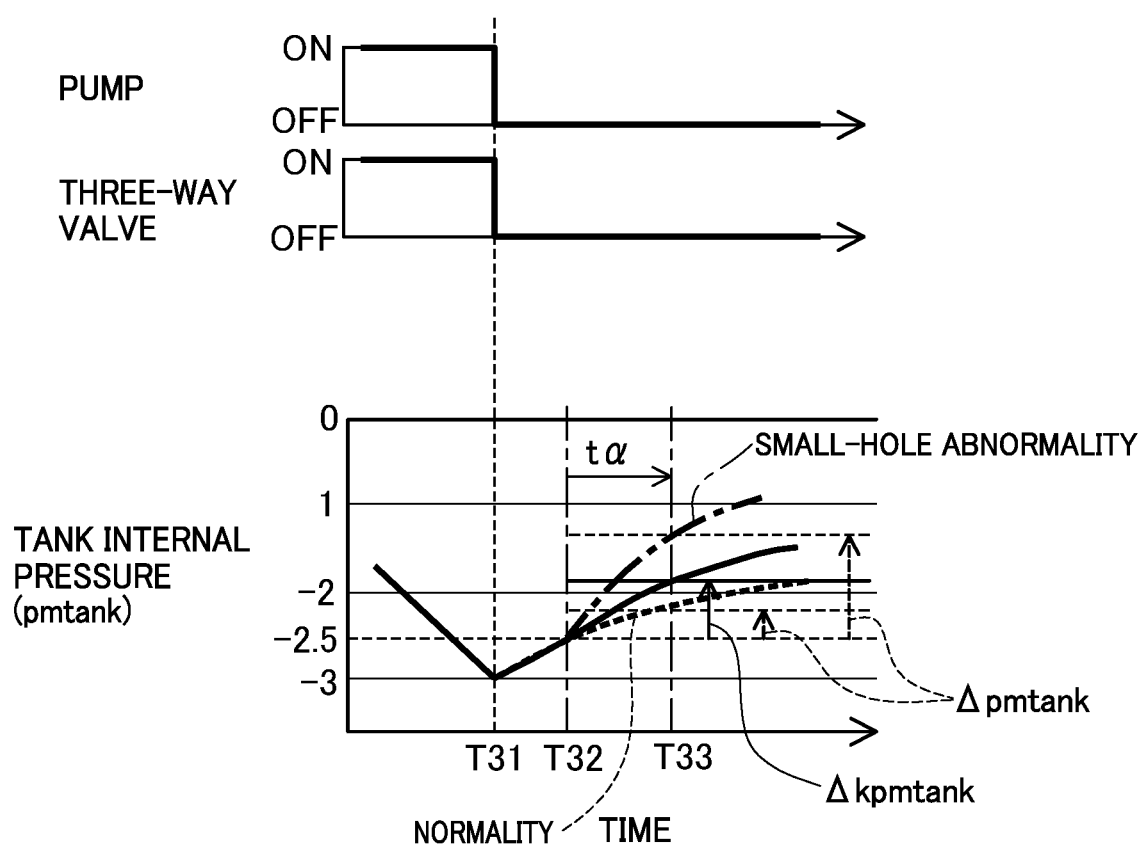
FIG. 19 is a time chart during execution of small-hole detection control.

When the controls based on the foregoing control flowchart are executed by the ECU 12, for example, a small-hole detection plotted in a control time chart shown in FIG. 19 is executed. Specifically, when the pressure in the fuel tank 43 (pmtank) comes to −3 kPa at time T31 after the start of introduction of negative pressure, the pump 64 is turned OFF and the three-way valve 63 is turned OFF (the atmosphere open state). When the pressure in the fuel tank 43 (pmtank) rises to −2.5 kPa at time T32, the pressure rise per time to (Δkpmtank), which serves as a reference for determination, from −2.5 kPa is decided at time T33 after a lapse of the time to from the time T32. If an actual pressure rise per time (Δpmtank) is small as indicated with a broken line relative to the pressure rise (Δkpmtank), the normality determination is made. If it is large as indicated with a chain line, the small-hole abnormality is detected.

According to the exhaust purification system in the present embodiment described above, the hole detection in the purge passages 51, 61 can be made during stop of the engine 11, so that the hole abnormality can be early found. Since the volume of a negative pressure in the tank 43 changes depending on the fuel level (the fuel remaining amount) therein, the negative pressure being supplied when the hole detection is to be performed, the reference value for determination to detect a hole(s) is corrected in correspondence with the volume changes in the tank 43. This enables the hole detection to be performed with accuracy.

Second Embodiment

Figure 20:
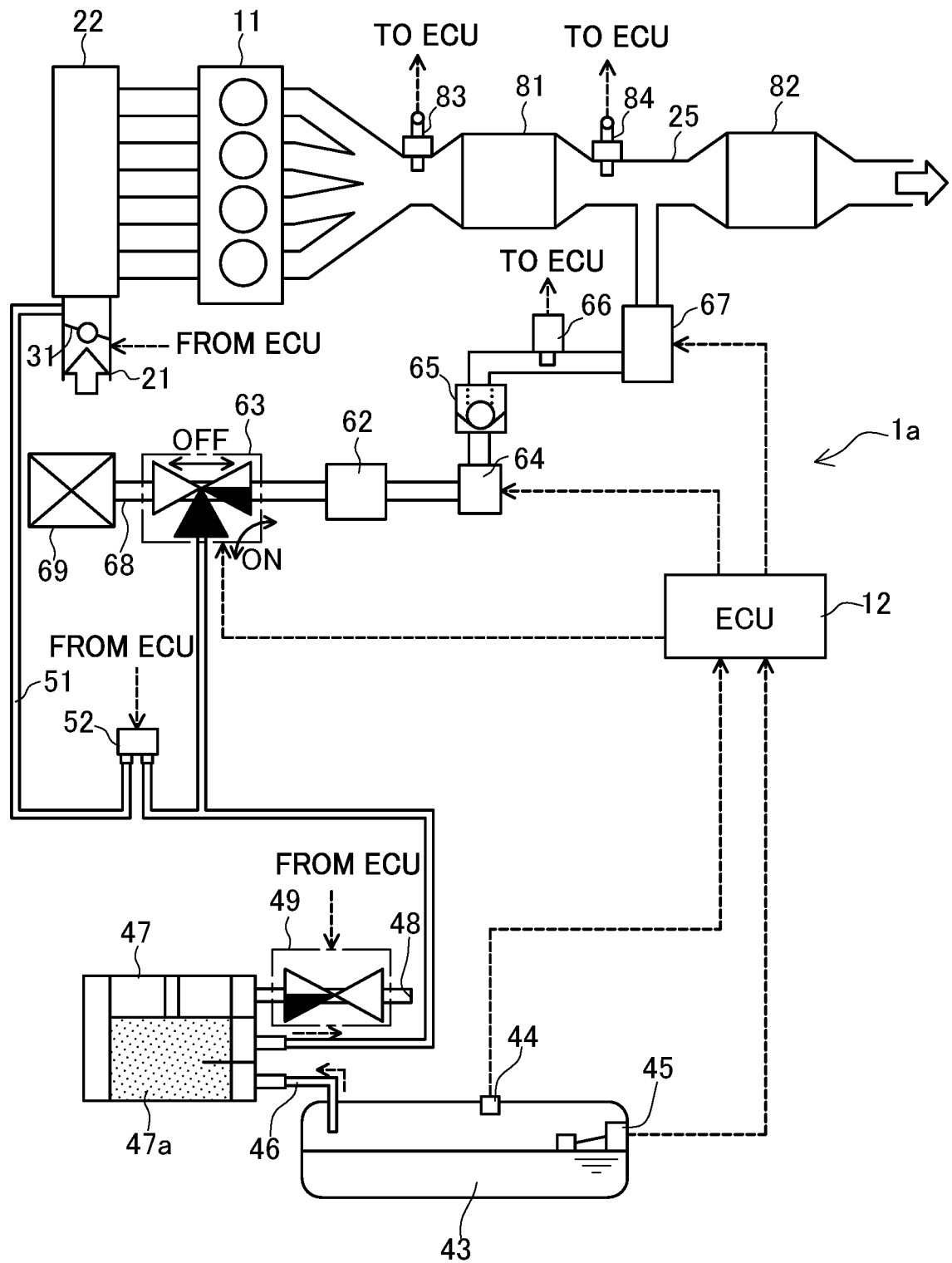
FIG. 20 is a configuration view of an exhaust purification system in a second embodiment.

A second embodiment will be described below with reference to FIG. 20. An exhaust purification system 1*a* in the second embodiment has a basic configuration substantially identical to the first embodiment, excepting the placement of a trap canister. Specifically, in the present embodiment, a trap canister 62 is placed between the three-way valve 63 and the pump 64 as shown in FIG. 20.

The exhaust purification system 1*a* can also perform the catalyst (GPF) regeneration process and the hole detection in the purge passages 51, 61 in the same manner as in the first embodiment. Thus, if the GPF regeneration request occurs, the system 1*a* can reliably burn the particulates accumulated in the catalyst 82 to and efficiently remove them. Since the hole detection in the purge passages 51, 61 can be performed during stop of the engine 11, the hole abnormality in the purge passages 51, 61 can be early found.

Herein, if the trap canister 62 is in a saturated state when the hole detection is to be performed, the trap canister 62 cannot trap purge gas from the canister 47 (including vapor in the fuel tank 43). Therefore, the trap canister 62 has to be subjected to the air purge by fresh air before the start of the key-off monitor in which the hole detection is performed. In the present embodiment, therefore, the trap canister 62 is placed between the three-way valve 63 and the pump 64 to enable the air purge of the trap canister 62. This air purge of the trap canister 62 is carried out when the ECU 12 performs a trap canister purge control based on a control flowchart shown in FIG. 21.

<Trap Canister Purge Control>

The ECU 12 first determines whether or not warm-up of the catalyst 82 has been completed (step S201). If the warm-up of the catalyst 82 has been completed (S201: YES), the ECU 12 determines whether or not a purge request to the trap canister 62 is present (step S202). If the purge request to the trap canister 62 is present (S202: YES), the ECU 12 then determines whether or not the air purge of the trap canister 62 is uncompleted (step S203). This determination is made on whether or not an air purge completion flag XTRAP_P is 0. It is determined that the air purge is uncompleted when the flag XTRAP_P is 0, but the purge has been completed when the flag XTRAP_P is 1. If warm-up of the catalyst 82 is uncompleted (S201: NO) or the purge request is absent (S202: NO), the flag XTRAP_P is set to 0 (step S211), and this process routine is temporarily terminated.

If the air purge is uncompleted (S203: YES), the ECU 12 turns the three-way valve 63 OFF, turns the pump 64 ON, and fully opens the flow control valve 67 (steps S204 to S206). In this way, the air purge of the trap canister 62 is carried out. At that time, the purge gas purged from the trap canister 62 flows in the exhaust passage 25 and burns in the catalyst 82 because the catalyst 82 is in a warm-up completion state.

When a predetermined purge time D has elapsed thereafter (step S207: YES), the ECU 12 turns the pump 64 from ON to OFF, fully closes the flow control valve 67, and sets the flag XTRAP_P to 1 (steps S208 to S210). In this way, the air purge of the trap canister 62 is completed. In contrast, if the air purge has been completed (S203: NO), this process routine is terminated.

According to the exhaust purification system 1*a* in the second embodiment, when the warm-up of the catalyst 82 has been completed and there is a purge request to the trap canister 62 in the saturated state, the air purge of the trap canister 62 is carried out. Accordingly, at the start of execution of the hole detection in the purge passages 51, 61, the saturated state of the trap canister 62 has already been resolved, so that the trap canister 62 can reliably trap the purge gas from the canister 47 (including the vapor in the fuel tank 43). Thus, when performing the hole detection (during stop of an internal combustion engine), the system 1*a* can make sure to prevent the purge gas from flowing in the exhaust passage 25. This can reliably prevent the purge gas from releasing from the exhaust passage 25 to the atmosphere.

<Modified Example of Trap Canister Purge Control>

Figure 21:
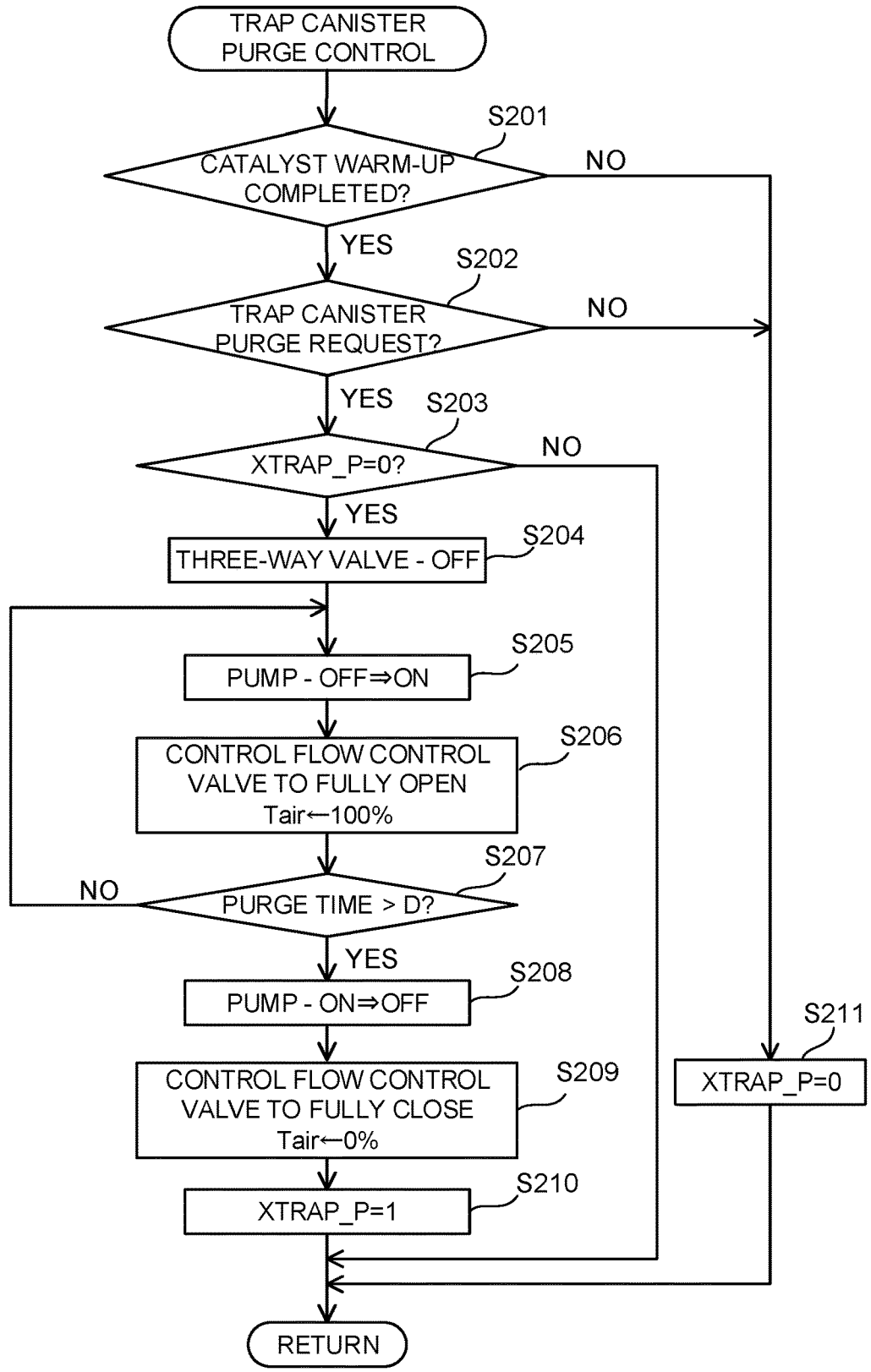
FIG. 21 is a control flowchart showing contents of trap canister purge control.
Figure 22:
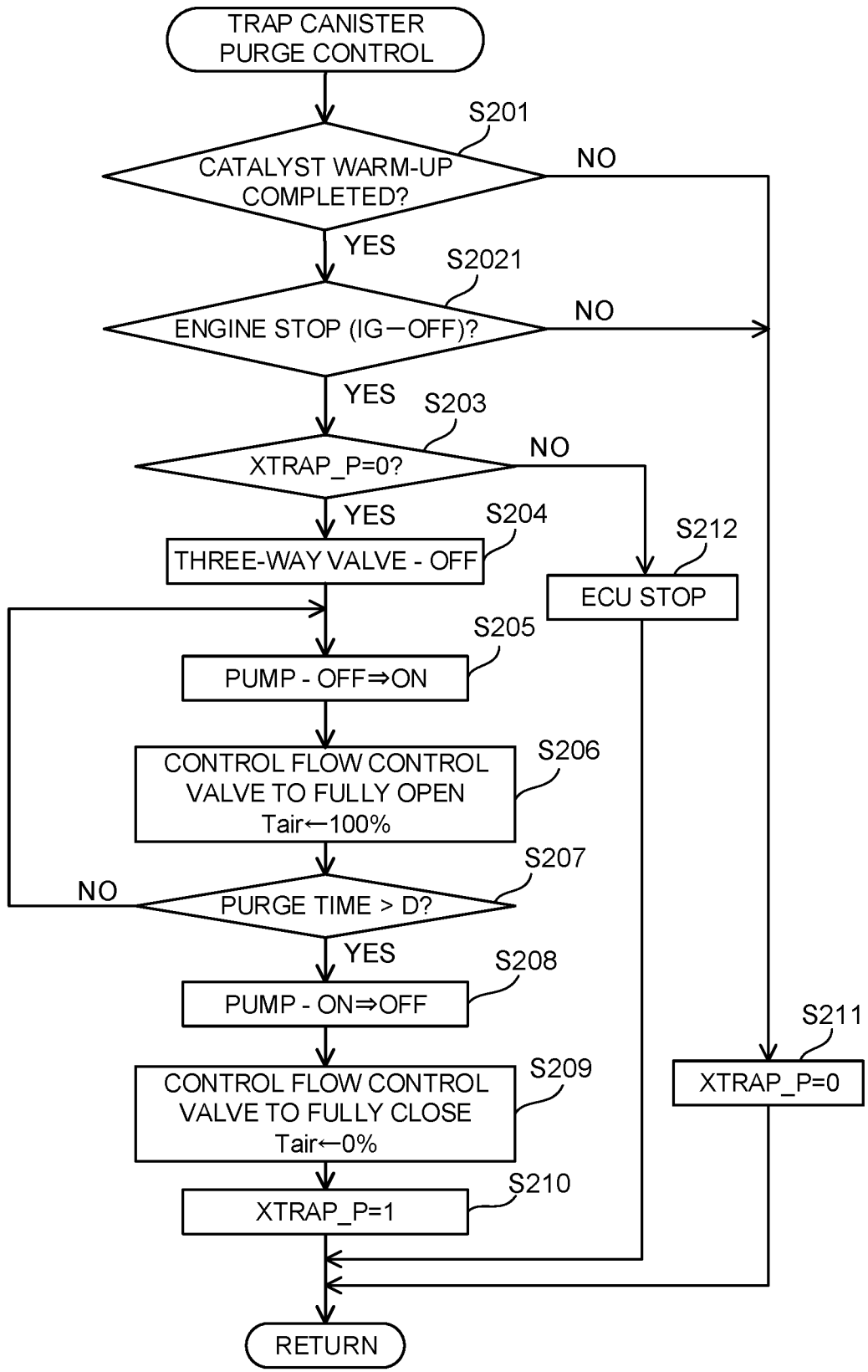
FIG. 22 is a control flowchart showing contents of a modified example of the trap canister purge control.

A modified example of the air purge purge control of the trap canister 62 will be described below. In this modified example, the air purge of the trap canister 62 is performed, not when the trap canister 62 is in the saturated state and a purge request is present, but when the engine 11 is stopped. That is, the air purge of the trap canister 62 is performed every time the engine 11 is stopped, as shown in FIG. 22. Other processes are basically the same as those in FIG. 21 and hence the same processes in FIG. 22 as those in FIG. 21 are assigned the same reference signs and their details are not repeated.

Specifically, as shown in FIG. 22, after completion of warm-up of the catalyst 82 (S201: YES), the ECU 12 determines whether or not the engine has stopped (an ignition (IG) has been turned OFF) (step S2021). When the engine 11 has stopped (S2021: YES) and the air purge is uncompleted (S203: YES), the ECU 12 performs the processes in S204 and subsequent steps to carry out the air purge of the trap canister 62. If the air purge is completed (S203: NO), the ECU 12 stops (step S212).

According to the present modified example described above, every time the engine 11 is stopped while the catalyst 82 is in a completely warmed-up state, the air purge of the trap canister 62 is performed. Accordingly, prior to the start of execution of the hole detection in the purge passages 51, 61, the saturated state of the trap canister 62 has been already reliably resolved, so that the trap canister 62 can reliably trap the particulates from the canister 47 (including the vapor in the fuel tank 43). Thus, in performing the hole detection (during stop of the engine 11), the system 1*a* enables to prevent the purge gas from flowing in the exhaust passage 25. This can reliably prevent purge gas from releasing from the exhaust passage 25 to the atmosphere.

Third Embodiment

Figure 23:
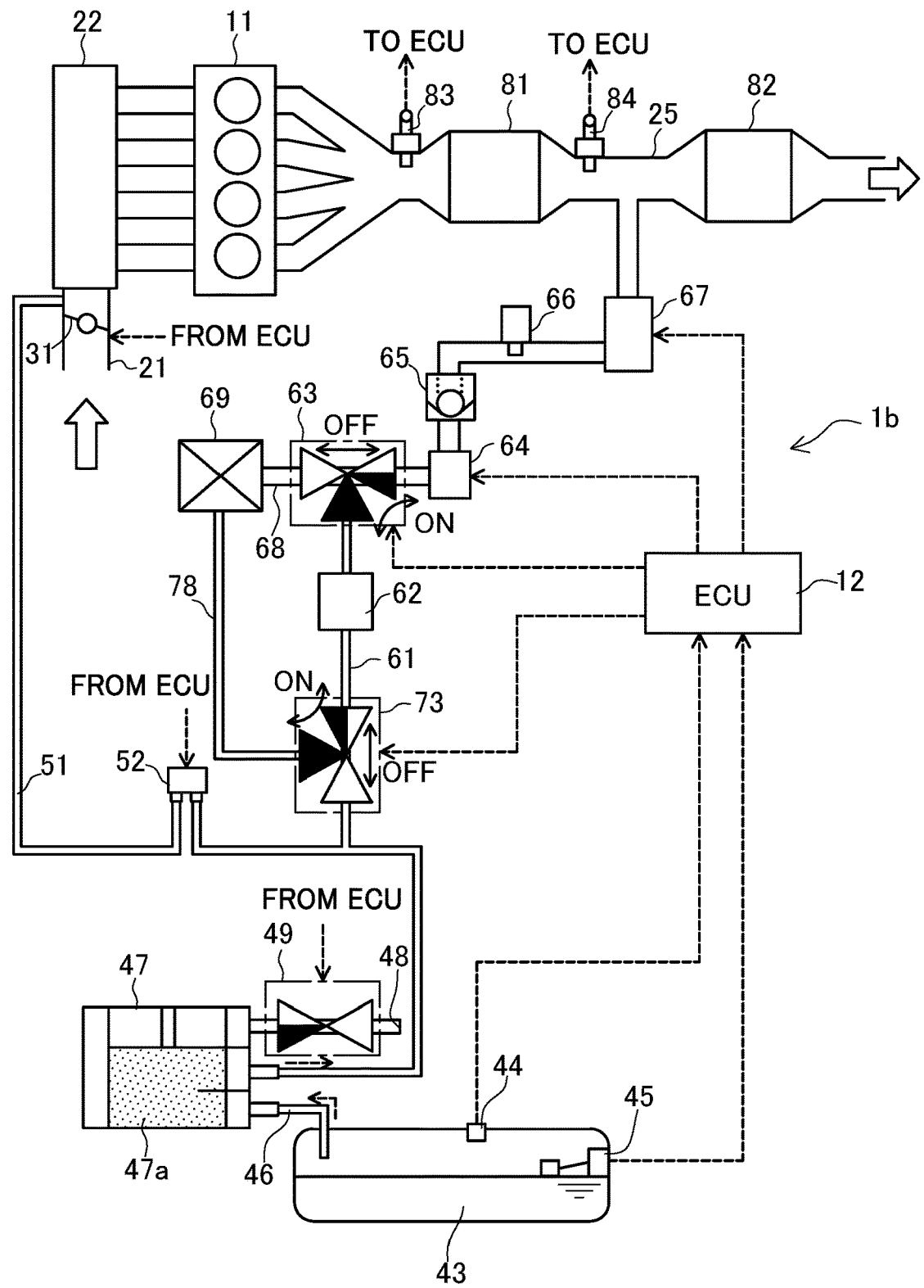
FIG. 23 is a configuration view of an exhaust purification system in a third embodiment.

A third embodiment will be described below with reference to FIG. 23. An exhaust purification system 1*b* in the third embodiment has a basic configuration substantially identical to the first embodiment, excepting the addition of a three-way valve 73 for trap canister. Specifically, in the present embodiment, the three-way valve 73 for trap canister is placed upstream of the trap canister 62 as shown in FIG. 23. This three-way valve 73 for trap canister is controlled by the ECU 12 to switch between a state (OFF) for allowing the trap canister 62 to communicate with the canister 47 and a state (ON) for allowing the trap canister 62 to communicate with an air inlet pipe 78. The air filter 69 is attached to one end of the air inlet pipe 78.

In the exhaust purification system 1*b*, when the three-way valve 73 for trap canister brings the trap canister 62 in a communication state with the canister 47, the catalyst (GPF) regeneration process and the hole detection in the purge passages 51, 61 can be performed in the same manner as in the first embodiment. Thus, if the GPF regeneration request occurs, the system 1b can reliably burn and efficiently remove the particulates accumulated in the catalyst 82. Since the hole detection in the purge passages 51, 61 can be performed during stop of the engine 11, the hole abnormality can be early found.

<Trap Canister Purge Control>

In the present embodiment, air purge of the trap canister 62 can be performed by the three-way valve 73 for trap canister added instead of changing the position of the trap canister 62 as in the second embodiment. This air purge of the trap canister 62 is carried out when the ECU 12 performs a trap canister purge control based on a control flowchart shown in FIG. 24. Any controls other than the controls of the three-way valves 63, 73 are basically the same as those shown in FIG. 21 in the second embodiment and hence the same processes in FIG. 24 as those in FIG. 21 are assigned the same reference signs and their details are not repeated.

Figure 24:
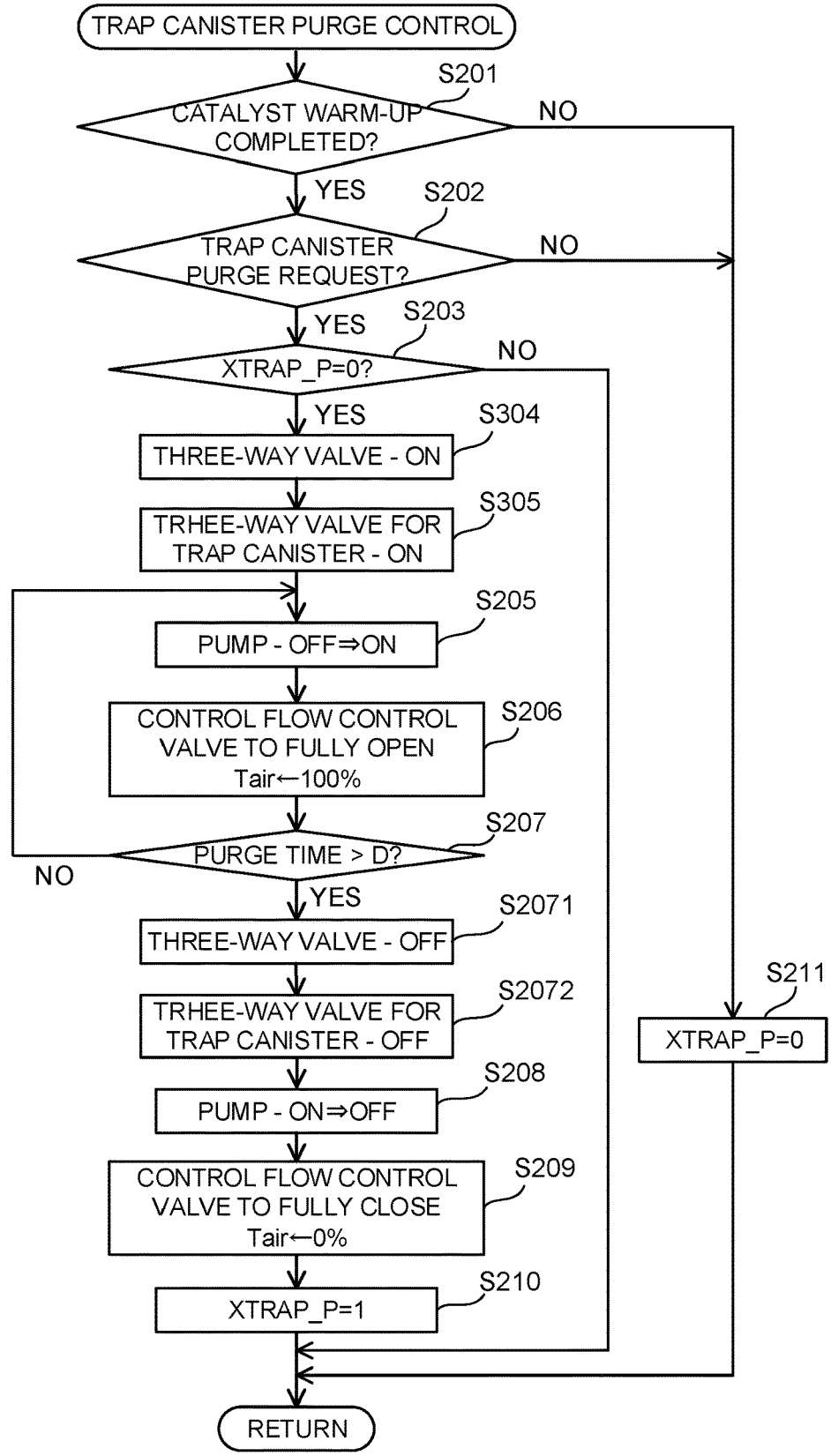
FIG. 24 is a control flowchart showing contents of trap canister purge control.

Specifically, as shown in FIG. 24, after the processes in S201 to S203, if the air purge is uncompleted (S203: YES), the ECU 12 turns the three-way valve 63 ON (the communication state) (step S304) and turns the three-way valve 73 for trap canister ON to allow the trap canister 62 to communicate with the air inlet pipe 78 (step S305). The ECU 12 performs the processes in S205 and subsequent steps to carry out the air purge of the trap canister 62.

Subsequently, if the predetermined purge time D has elapsed (S207: YES), the ECU 12 turns the three-way valve 63 OFF (the atmosphere open state) (step S2071) and turns the three-way valve 73 for trap canister OFF to allow the trap canister 62 to communicate with the canister 47 (step S2072). The ECU 12 performs the processes in S208 to S210 and terminates the air purge purge control on the trap canister 62.

According to the exhaust purification system 1b in the third embodiment, if a purge request is present when the trap canister 62 is in the saturated state while the catalyst 82 is in a completely warmed-up state, the air purge of the trap canister 62 is performed with fresh air introduced through the air inlet pipe 78 via the three-way valve 73 for trap canister. Thus, before the start of execution of the hole detection in the purge passages 51, 61, the saturated state of the trap canister 62 has been resolved, so that the trap canister 62 can reliably trap the purge gas from the canister 47 (including the vapor in the fuel tank 43). Therefore, in performing the hole detection (during stop of the engine 11), the system 1b enables to prevent the purge gas from flowing in the exhaust passage 25. This can reliably prevent purge gas from releasing from the exhaust passage 25 to the atmosphere.

<First Modified Example of Trap Canister Purge Control>

Figure 25:
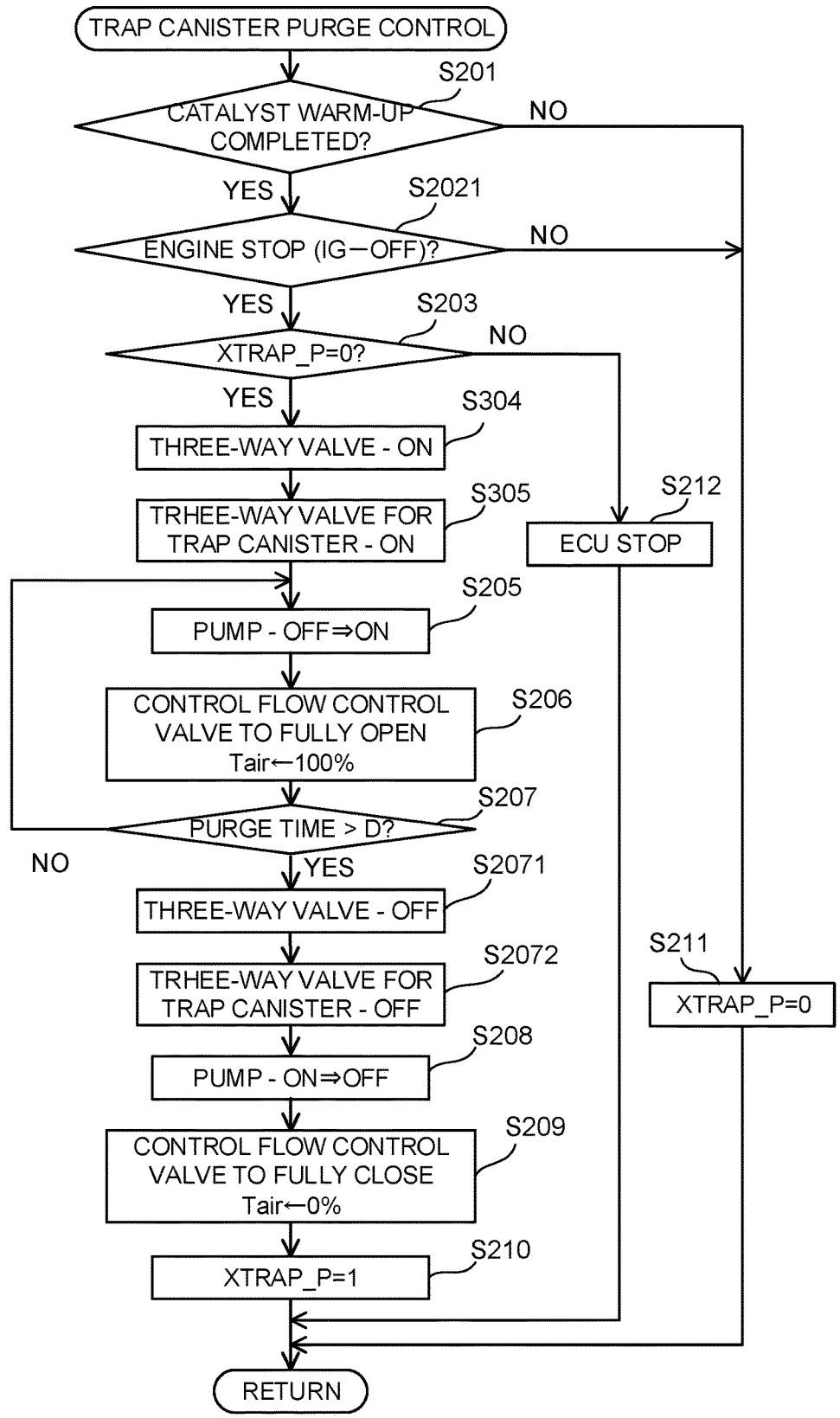
FIG. 25 is a control flowchart showing contents of a first modified example of trap canister purge control.

In the exhaust purification system 1b in the third embodiment, similar to the modified example of the second embodiment, the air purge of the trap canister 62 can be performed when the engine 11 is stopped. In this first modified example of the air purge control of the trap canister 62, the air purge of the trap canister 62 is performed, not when the trap canister 62 is in the saturated state and a purge request is present, but when the engine 11 is stopped. That is, the air purge of the trap canister 62 is performed every time the engine 11 is stopped, as shown in FIG. 25. Any other controls are basically the same as those in FIG. 24. The same processes in FIG. 25 as those in FIG. 24 are assigned the same reference signs and their details are not repeated.

Specifically, as shown in FIG. 25, after completion of warm-up of the catalyst 82 (S201: YES), the ECU 12 determines whether or not the engine 11 has stopped (IG has been turned OFF) (step S2021). When the engine 11 has stopped (S2021: YES) and the air purge is uncompleted (S203: YES), the ECU 12 performs the processes in S304 and subsequent steps to carry out the air purge of the trap canister 62. If the air purge has been completed (S203: NO), the ECU 12 stops (step S212).

According to the first modified example described above, every time the engine 11 is stopped while the catalyst 82 is in a completely warmed-up state, the air purge of the trap canister 62 is performed. Thus, prior to the start of execution of the hole detection in the purge passages 51, 61, the saturated state of the trap canister 62 has been already reliably resolved, so that the trap canister 62 can reliably trap the purge gas from the canister 47 (including the vapor in the fuel tank 43). Accordingly, in performing the hole detection (during stop of the engine 11), the system 1b enables to prevent the purge gas from flowing in the exhaust passage 25. This can reliably prevent the purge gas from releasing from the exhaust passage 25 to the atmosphere.

<Second Modified Example of Trap Canister Purge Control>

Figure 26:
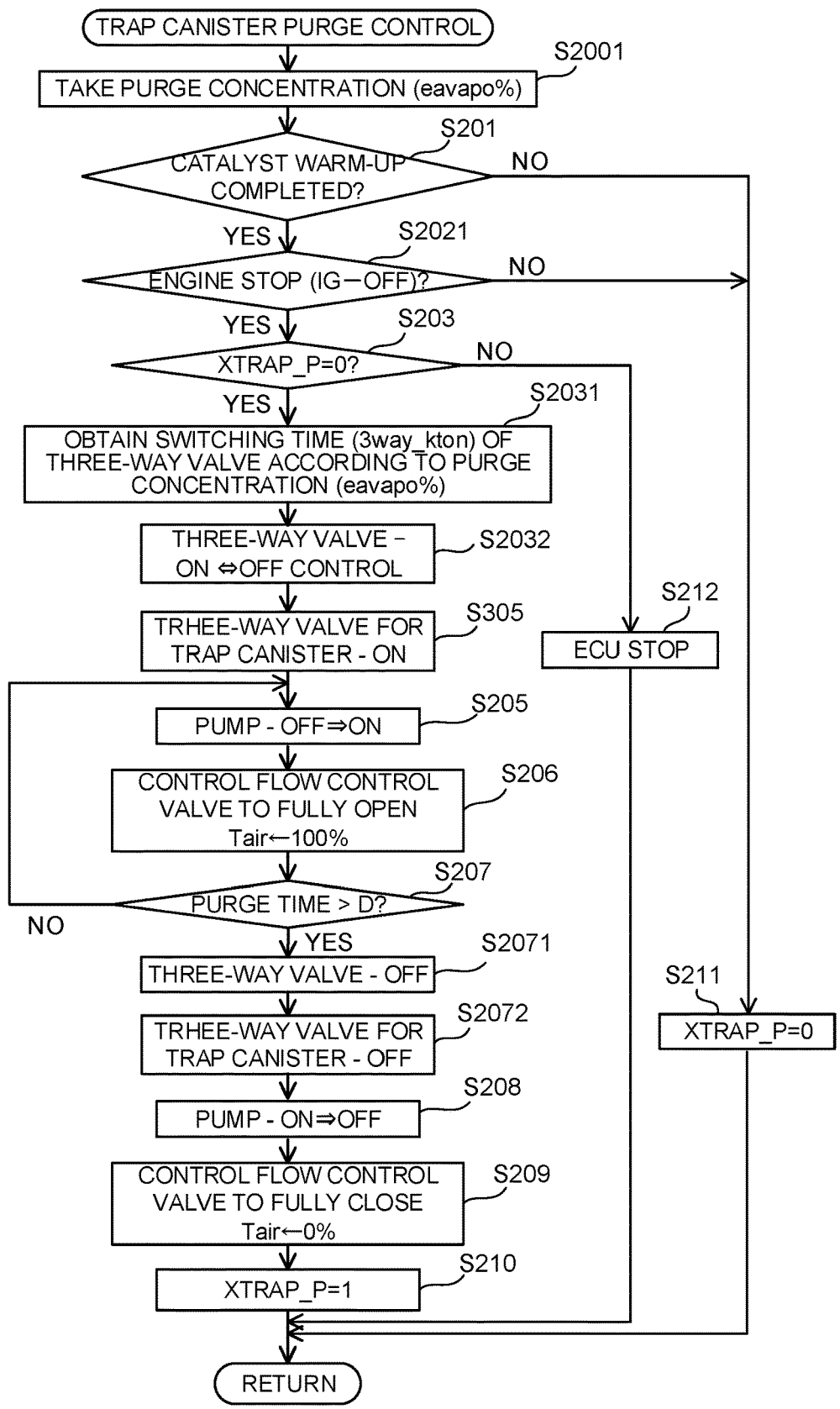
FIG. 26 is a control flowchart showing contents of a second modified example of trap canister purge control.

Furthermore, when performing the air purge of the trap canister 62, the exhaust purification system 1b in the third embodiment also can be operated to alternately supply the purge gas from the trap canister 62 and air to the exhaust passage 25, thereby performing a dilution purge control for diluting the concentration of the purge gas to be supplied to the exhaust passage 25. In this dilution purge control which is a second modified example of the trap canister purge control, as shown in FIG. 26, when the air purge of the trap canister 62 is to be performed, the three-way valve 63 is alternately switched between ON (the communication state) and OFF (the atmosphere open state) at a predetermined ratio determined according to the concentration of the purge gas at constant time intervals (every 2 seconds in the present embodiment). In other words, the same control as in the GPF regeneration process in the high purge concentration state is conducted. Any processes other than the switching control of the three-way valve 63 are basically the same as those in FIG. 25. Thus, the same processes in FIG. 26 as those in FIG. 25 are assigned the same reference signs and their details are not repeated.

Specifically, as shown in FIG. 26, the ECU 12 takes a purge concentration (eavapo %) (step S2001). The ECU 12 then performs the same processes as those in FIG. 25 and, if the air purge of the trap canister 62 is to be performed (S201: YES, S2021: YES, S203: YES), the ECU 12 determines a switching time (3way_kton) of the three-way valve 63 according to the purge concentration (eavapo %) (step S2031, see FIG. 11).

The ECU 12 then performs the ON/OFF switching control of the three-way valve 63 (see S55 to S59 and S61 to S64 in FIG. 10) to carry out the dilution purge of the trap canister 62 (step S2032). In other words, when the three-way valve 63 is controlled to switch between ON and OFF, the purge gas from the trap canister 62 and the air from the air inlet pipe 78 are alternately supplied to the exhaust passage 25. As a result, the purge gas from the trap canister 62 is supplied as being diluted to the exhaust passage 25.

According to the second modified example described above, every time the engine 11 is stopped while the catalyst 82 is in a completely warmed-up state, the dilution purge of the trap canister 62 is performed according to the purge concentration. Thus, if the purge gas trapped in the trap canister 62 has a high concentration, such a high-concentration purge gas purged from the trap canister 62 is diluted in concentration by air and then supplied to the exhaust passage 25 during the air purge of the trap canister 62. Therefore, the high-concentration purge gas is not allowed to flow in the exhaust passage 25 during the air purge of the trap canister 62. The purge gas flowing in the exhaust passage can be reliably burnt by the catalyst. Consequently, the system 1b can prevent the purge gas purged from the trap canister 62 from releasing as remaining unburnt to the atmosphere through the exhaust passage 25. Thus, prior to the start of execution of the hole detection in the purge passages 51, 61, the saturated state of the trap canister 62 has been already reliably resolved, the trap canister 62 can reliably trap the purge gas from the canister 47 (including the vapor in the fuel tank 43).

Fourth Embodiment

Figure 27:
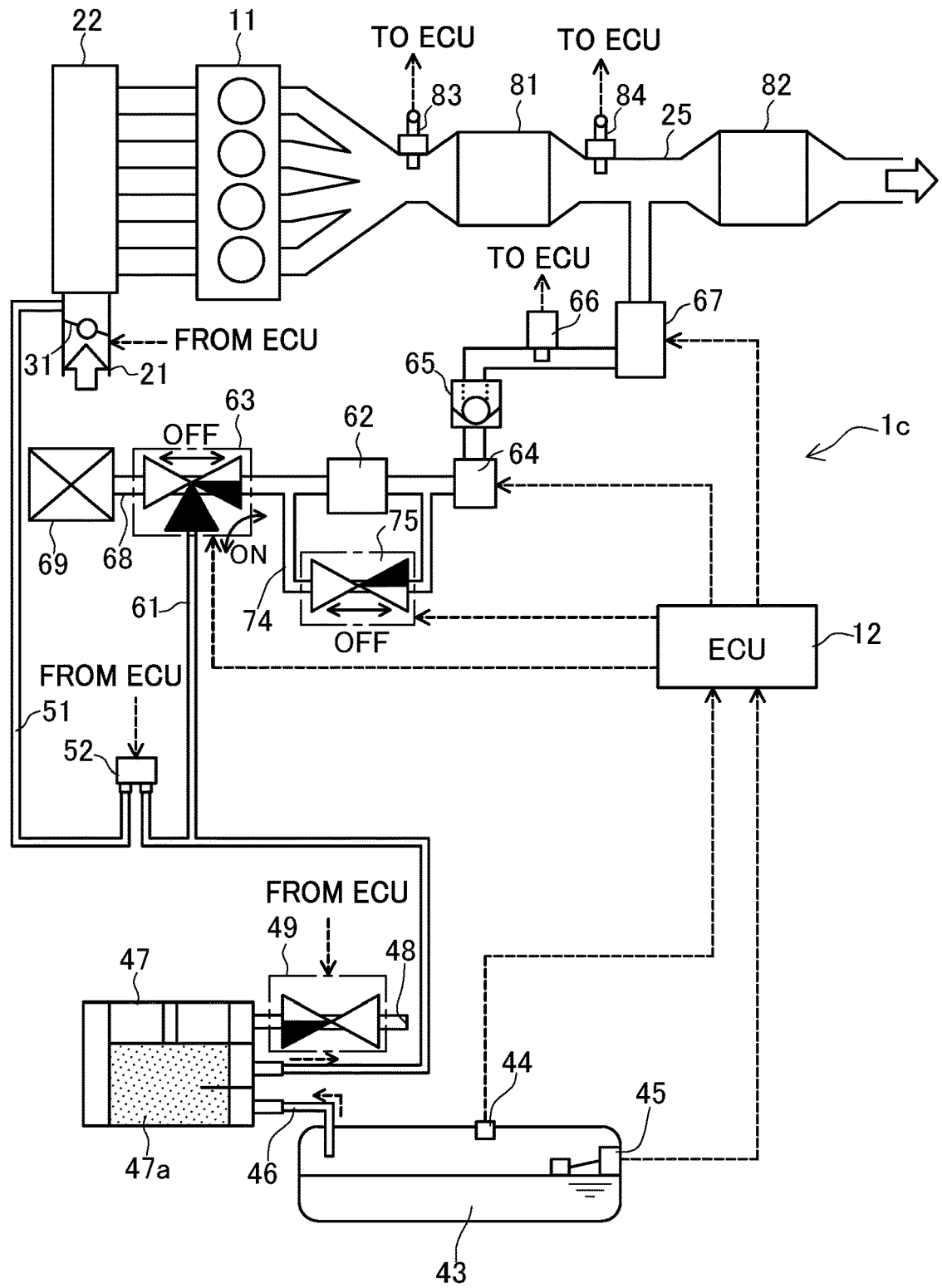
FIG. 27 is a configuration view of an exhaust purification system in a fourth embodiment.

A fourth embodiment will be described below with reference to FIG. 27. An exhaust purification system 1c in the fourth embodiment has a basic configuration substantially identical to that in the second embodiment, excepting addition of a bypass passage 74 for the trap canister 62 and a bypass on-off valve 75 placed to open and close the bypass passage 74. This bypass on-off valve 75 is controlled by the ECU 12 to switch between an ON state in which the valve 75 is fully closed, blocking off the bypass passage 74, and an OFF state in which the valve 75 is fully opened, opening the bypass passage 74.

The exhaust purification system 1c can also perform the catalyst (GPF) regeneration process and the hole detection in the purge passages 51, 61 in the same manner as in the second embodiment. Thus, if the GPF regeneration request occurs, the exhaust purification system 1c can reliably burn the particulates accumulated in the catalyst 82 to efficiently remove them. Since the hole detection in the purge passages 51, 61 can be performed during stop of the engine 11, the hole abnormality can be early found.

Herein, when purge gas from the canister 47 is to be supplied to the catalyst 82 during the GPF regeneration, the purge gas will pass through the trap canister 62. Thus, the purge gas is not allowed to be supplied to the catalyst 82 until the trap canister 62 comes to a saturated state. That is, during the GPF regeneration, supply of purge gas to the catalyst 82 may be delayed.

In the present embodiment, therefore, when purge gas from the canister 47 is to be supplied to the catalyst 82 during the GPF regeneration, the ECU 12 fully opens (OFF) the bypass on-off valve 75 to open the bypass passage 74. Accordingly, the purge gas from the canister 47 is supplied to the catalyst 82 through the bypass passage 74 by bypassing the trap canister 62. During the GPF regeneration, therefore, the exhaust purification system 1c even provided with the trap canister 62 can supply purge gas from the canister 47 to the catalyst 82 without delay.

In the exhaust purification system 1c, furthermore, when air purge of the trap canister 62 is to be performed, the ECU 12 fully closes the bypass on-off valve 75 (ON) to close the bypass passage 74 at the start of air purge (i.e., before turning the pump 64 ON) and fully opens the bypass on-off valve 75 (OFF) to open the bypass passage 74 at the end of air purge (i.e., before turning the pump 64 OFF). The foregoing control of the bypass on-off valve 75 enables air purge of the trap canister 62 in the same manner as in the second embodiment.

Figure 28:
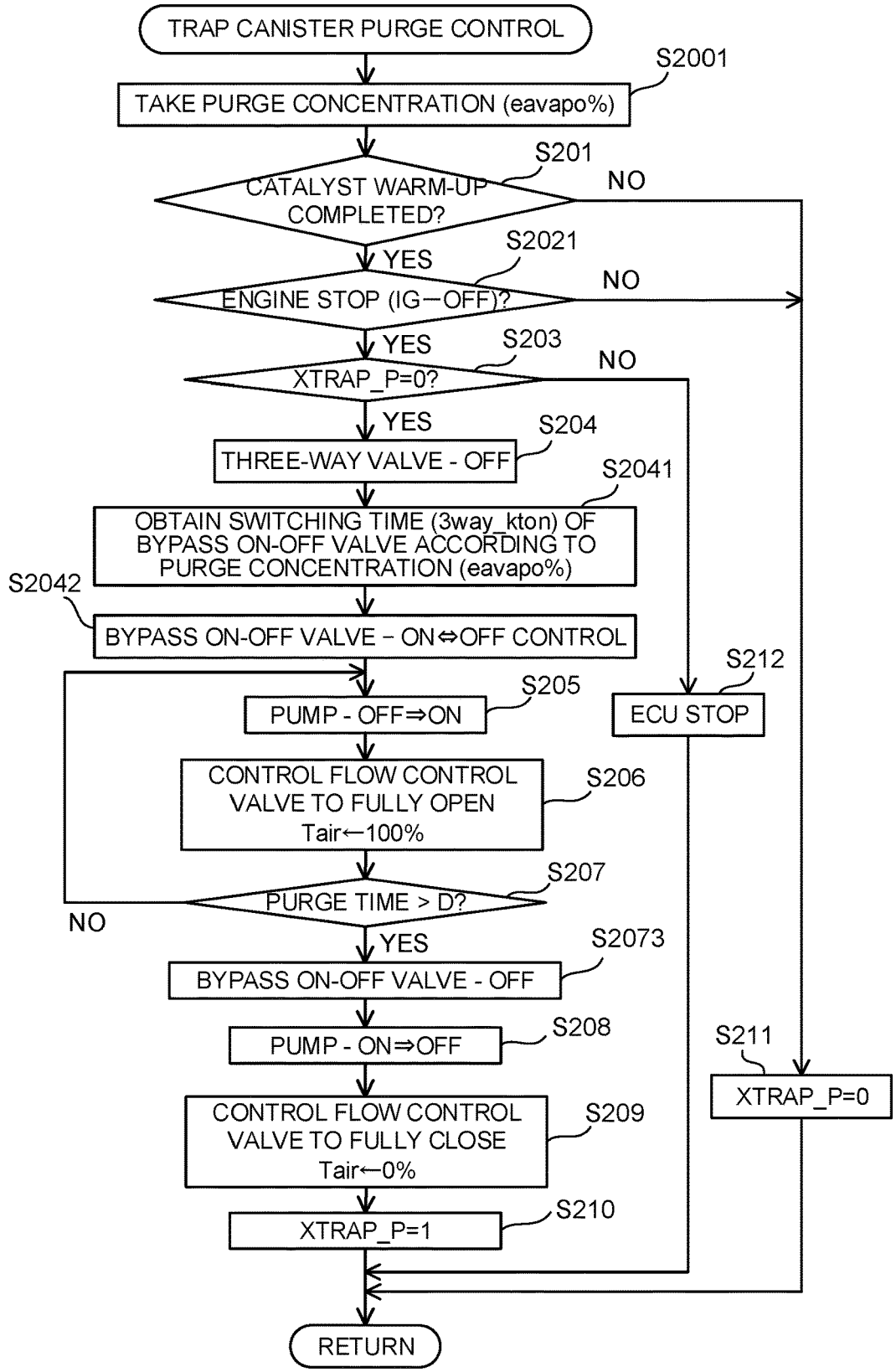
FIG. 28 is a control flowchart showing contents of dilution purge control of trap canister.

Moreover, the exhaust purification system 1c can also perform dilution purge control of the trap canister 62 in the same manner as in the second modified example of the third embodiment. In this dilution purge control, as shown in FIG. 28, when air purge of the trap canister 62 is to be performed, the bypass on-off valve 75 is alternately switched between ON (a fully closed state) and OFF (a fully open state) at a predetermined ratio determined according to the purge concentration of the purge gas at constant time intervals (every 2 seconds in the present embodiment). Any processes other than the switching control of the bypass on-off valve 75 are basically the same as those in shown in FIG. 22. Thus, the same processes in FIG. 28 as those in FIG. 22 are assigned the same reference signs and their details are not repeated.

Specifically, as shown in FIG. 28, the ECU 12 takes a purge concentration (eavapo %) (step S2001). The ECU 12 then performs the same processes as those in FIG. 22 and, if the air purge of the trap canister 62 is to be performed (S201: YES, S2021: YES, S203: YES), the ECU 12 turns the three-way valve 63 OFF (the atmosphere open state (step S204). Subsequently, the ECU 12 decides the switching time of the bypass on-off valve 75 according to the purge concentration (eavapo %) (step S2041). This switching time of the bypass on-off valve 75 is decided in the same manner as the switching time (3way_kton) of the three-way valve 63 (see FIG. 11).

The ECU 12 performs the ON/OFF (full-close/full-open) switching control (see S55-S59, S61-S64 in FIG. 10) of the bypass on-off valve 75 to perform the dilution purge of the trap canister 62 (step S2042). In other words, when the bypass on-off valve 75 is controlled to switch between ON and OFF, the purge gas through the trap canister 62 and air through the air inlet pipe 68 are alternately supplied to the exhaust passage 25. Consequently, the purge gas through the trap canister 62 is supplied as being diluted with air to the exhaust passage 25. Upon termination of the dilution purge of the trap canister 62 (S207: YES), the bypass on-off valve 75 is turned OFF (full-open) (step S2073).

Fifth Embodiment

Figure 29:
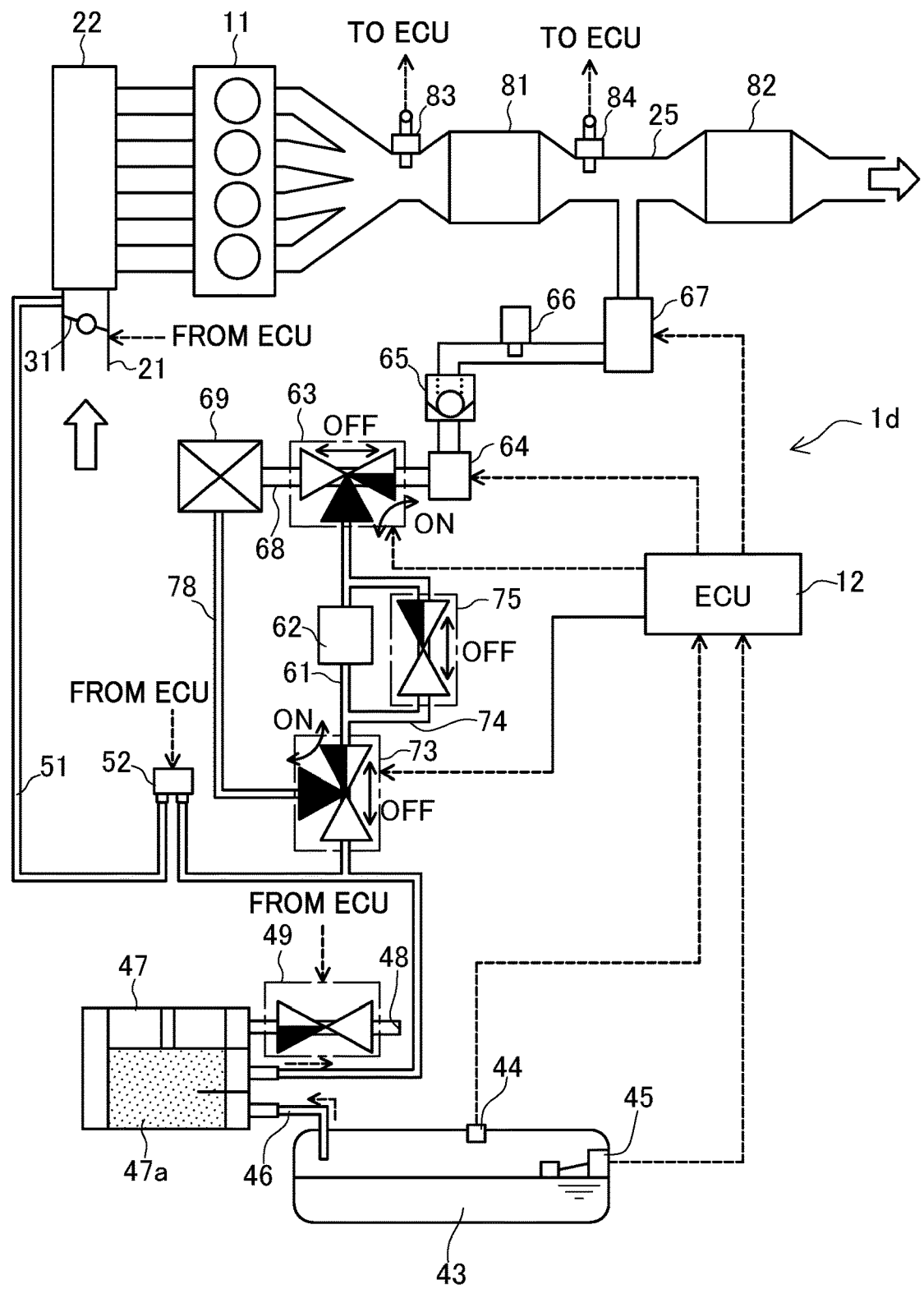
FIG. 29 is a configuration view of an exhaust purification system in a fifth embodiment.

A fifth embodiment will be described below with reference to FIG. 29. An exhaust purification system 1d in the fifth embodiment has a basic configuration substantially identical to that in the third embodiment, excepting that a bypass passage 74 is provided for the trap canister 62 and a bypass on-off valve 75 is placed to open and close the bypass passage 74.

The exhaust purification system 1d also can perform the catalyst (GPF) regeneration process and the hole detection in the purge passages 51, 61 in the same manner as in the third embodiment. Thus, when the GPF regeneration request occurs, the exhaust purification system 1d can reliably burn the particulates accumulated in the catalyst 82 to efficiently remove them. Since the hole detection in the purge passages 51, 61 can be performed during stop of the engine 11, the hole abnormality can be early found.

Herein, when purge gas from the canister 47 is to be supplied to the catalyst 82 during the GPF regeneration, the purge gas will pass through the trap canister 62. Thus, the purge gas is not allowed to be supplied to the catalyst 82 until the trap canister 62 comes to a saturated state. That is, during the GPF regeneration, supply of purge gas to the catalyst 82 may be delayed.

In the present embodiment, therefore, when purge gas from the canister 47 is to be supplied to the catalyst 82 during the GPF regeneration, the ECU 12 fully opens the bypass on-off valve 75 to open the bypass passage 74. Accordingly, the purge gas from the canister 47 is supplied to the catalyst 82 through the bypass passage 74 by bypassing the trap canister 62. During the GPF regeneration, therefore, the exhaust purification system 1*d* even provided with the trap canister 62 can supply purge gas from the canister 47 to the catalyst 82 without delay.

In the exhaust purification system 1*d*, furthermore, when air purge of the trap canister 62 is to be performed, the ECU 12 fully closes the bypass on-off valve 75 (ON) to close the bypass passage 74 at the start of air purge (i.e., before the turning pump 64) and fully closes the bypass on-off valve 75 (OFF) to open the bypass passage 74 at the end of air purge (i.e., before turning the pump 64 OFF). The foregoing control of the bypass on-off valve 75 in the present embodiment enables all the three patterns of purge control of the trap canister 62 as exemplified in the third embodiment.

The foregoing embodiments are mere examples and are not intended to limit the present disclosure. The present disclosure may be embodied in other specific forms without departing from the essential characteristics thereof. For instance, the above-described embodiments include the trap canister 62; however, the trap canister 62 may not be provided if only the GPF regeneration is performed and the hole detection in the purge passages 51, 61 is not carried out.

REFERENCE SIGNS LIST

1 Exhaust purification system
11 Engine
12 ECU
21 Intake passage
25 Exhaust passage
43 Fuel tank
44 Tank pressure sensor
45 Fuel level gauge
47 Canister
51 Intake-side purge passage
52 Purge valve
61 Exhaust-side purge passage
62 Trap canister
63 Three-way valve
64 Pump
65 Check valve
66 Pressure sensor
67 Flow control valve
68 Air inlet pipe
73 Three-way valve for trap canister
74 Bypass passage
75 Bypass on-off valve
78 Air inlet pipe
81 Catalyst
82 Catalyst

The invention claimed is:

1. An exhaust purification system comprising:
a canister configured to trap evaporated fuel that evaporates from a fuel tank;
an intake-side purge passage connecting the canister and an intake passage of an internal combustion engine;
a purge valve configured to open and close the intake-side purge passage;
a catalyst configured to trap particulates in exhaust gas to purify the exhaust gas;
an exhaust-side purge passage branching from the intake-side purge passage at an upstream side of the purge valve, the exhaust-side purge passage connecting to the canister and to an exhaust passage of the internal combustion engine on an upstream side of the catalyst;
a pump provided in the exhaust-side purge passage and configured to supply air or purge gas purged from the canister to the catalyst;
a three-way valve provided on an upstream side of the pump in the exhaust-side purge passage and configured to switch a state of the exhaust-side purge passage between a communication state allowing the pump to communicate with the canister and an atmosphere open state allowing the pump to communicate with atmosphere;
a flow control valve provided on a downstream side of the pump in the exhaust-side purge passage and configured to control a flow rate of air to be supplied to the catalyst; and
a controller configured to control the purge valve, the pump, the three-way valve, and the flow control valve when a request for catalyst regeneration occurs, to supply a necessary amount of air to burn the particulates trapped in the catalyst and a necessary amount of the purge gas purged from the canister to the catalyst.

2. The exhaust purification system according to claim 1, wherein the controller is configured to control each operation of the purge valve, the pump, and the three-way valve based on an estimated bed temperature of the catalyst calculated based on a rotation speed of the internal combustion engine, an intake air amount, and an air-fuel ratio, and a concentration of the purge gas purged from the canister into the intake-side purge passage, and control an opening degree of the flow control valve based on the intake air amount of the internal combustion engine.

3. The exhaust purification system according to claim 2, wherein when it is determined that the estimated bed temperature of the catalyst is equal to or higher than a predetermined temperature, the controller is configured to bring the three-way valve into the atmosphere open state.

4. The exhaust purification system according to claim 2, wherein when it is determined that the estimated bed temperature of the catalyst is lower than a predetermined temperature and the concentration of the purge gas is lower than a first predetermined concentration at which particulates accumulated in the catalyst are burnt by the purge gas, the controller is configured to perform rich control of the internal combustion engine so that an air-fuel ratio is lower than a theoretical air-fuel ratio and bring the three-way valve into the atmosphere open state.

5. The exhaust purification system according to claim 2, wherein when it is determined that the estimated bed temperature of the catalyst is lower than a predetermined temperature and the concentration of the purge gas is equal to or higher than a first predetermined concentration at which particulates accumulated in the catalyst are burnt by the purge gas, the controller is configured to fully close the purge valve to close off the intake-side purge passage and bring the three-way valve into the communication state.

6. The exhaust purification system according to claim 5, wherein when it is determined that the concentration of the purge gas is equal to or higher than a second predetermined concentration that is higher than the first predetermined concentration, the controller is configured to perform switch control to switch the three-way valve between the communication state and the atmosphere open state at a predetermined ratio within a constant time determined according to the concentration of the purge gas at intervals of the constant time.

7. The exhaust purification system according to claim 1 further comprising:
an on-off valve configured to open and close an atmosphere port of the canister; and
a pressure sensor configured to detect pressure in the fuel tank,
wherein the controller is configured to:
control the on-off valve, the purge valve, the three-way valve, the flow control valve, and the pump after stop of the internal combustion engine to generate a negative pressure in the exhaust-side purge passage on an upstream side of the three-way valve and in the intake-side purge passage on an upstream side of the purge valve, the purge passages being connected to the fuel tank;
detect the pressure in the fuel tank through the pressure sensor; and
detect whether a hole exists in the exhaust-side purge passage and the intake-side purge passage based on a change in the pressure detected by the pressure sensor.

8. The exhaust purification system according to claim 7, wherein the controller is configured to correct a determination reference value for detecting whether or not a hole exists according to a fuel level in the fuel tank.

9. The exhaust purification system according to claim 7 further comprising a trap canister provided in the exhaust-side purge passage on the upstream side of the pump and configured to trap the purge gas.

10. The exhaust purification system according to claim 9 further comprising:
a bypass passage detouring around the trap canister; and
a bypass passage on-off valve configured to open and close the bypass passage,
wherein the controller is configured to fully open the bypass passage on-off valve to open the bypass passage when the request for regeneration of the catalyst occurs.

11. The exhaust purification system according to claim 10, wherein the controller is configured to perform switching control to switch the bypass passage on-off valve between a fully closed state and a fully open state at a predetermined ratio within a constant time determined according to a concentration of the purge gas at intervals of the constant time during the air purge of the trap canister.

12. The exhaust purification system according to claim 9, wherein
the trap canister is provided between the three-way valve and the pump, and
the controller is configured to control the three-way valve, the pump, and the flow control valve to perform air purge of the trap canister after completion of warm-up of the catalyst.

13. The exhaust purification system according to claim 12, wherein the controller is configured to perform air purge of the trap canister when a purge request is present while the trap canister is in a saturated state.

14. The exhaust purification system according to claim 12, wherein the controller is configured to perform the air purge of the trap canister when the internal combustion engine is stopped.

15. The exhaust purification system according to claim 9, wherein
the trap canister is provided on the upstream side of the three-way valve,
the exhaust purification system further includes a three-way valve for trap canister provided on an upstream side of the trap canister and configured to allow the trap canister to communicate with either the canister or atmosphere, and
the controller is configured to control the three-way valve, the three-way valve for trap canister, the pump, and the flow control valve to perform the air purge of the trap canister after completion of warm-up of the catalyst.

16. The exhaust purification system according to claim 15, wherein the controller is configured to switch the three-way valve between the communication state and the atmosphere open state at a predetermined ratio within a constant time determined according to a concentration of the purge gas at intervals of the constant time during the air purge of the trap canister.

17. The exhaust purification system according to claim 15, wherein the controller is configured to perform air purge of the trap canister when a purge request is present while the trap canister is in a saturated state.

18. The exhaust purification system according to claim 15, wherein the controller is configured to perform the air purge of the trap canister when the internal combustion engine is stopped.

* * * * *